United States Patent
Edwards et al.

(10) Patent No.: US 8,184,400 B2
(45) Date of Patent: May 22, 2012

(54) SYSTEM AND METHOD FOR PROTECTING REMOVEABLE MEDIA PLAYBACK DEVICES

(75) Inventors: Bruce Edwards, San Rafael, CA (US); Nicholas R. Kalayjian, San Carlos, CA (US); Craig M. Janik, Los Altos Hills, CA (US)

(73) Assignee: Viviana Research LLC, Dover, DE (US)

( * ) Notice: Subject to any disclaimer, the term of this patent is extended or adjusted under 35 U.S.C. 154(b) by 16 days.

(21) Appl. No.: 12/606,386

(22) Filed: Oct. 27, 2009

(65) Prior Publication Data

US 2010/0046113 A1 Feb. 25, 2010

Related U.S. Application Data

(63) Continuation of application No. 11/018,297, filed on Dec. 21, 2004, now Pat. No. 7,652,844.

(60) Provisional application No. 60/532,056, filed on Dec. 24, 2003.

(51) Int. Cl.
| | |
|---|---|
| G11B 23/03 | (2006.01) |
| G11B 25/04 | (2006.01) |
| G11B 17/02 | (2006.01) |
| G11B 33/08 | (2006.01) |
| G11B 33/14 | (2006.01) |

(52) U.S. Cl. .................. 360/133; 360/97.02; 360/99.06; 720/630; 720/731; 720/736

(58) Field of Classification Search ............... 360/97.01, 360/97.02, 97.03, 97.04, 98.01, 99.06, 99.07, 360/133; 720/601, 630, 725, 736, 726, 728, 720/731
See application file for complete search history.

(56) References Cited

U.S. PATENT DOCUMENTS

| | | | |
|---|---|---|---|
| 5,043,974 A | 8/1991 | Nakagawa | |
| 5,084,861 A | 1/1992 | Takahashi | |
| 5,149,048 A * | 9/1992 | Morehouse et al. | ....... 360/97.02 |
| 5,214,550 A | 5/1993 | Chan | |
| 5,434,860 A | 7/1995 | Riddle | |
| 5,526,337 A | 6/1996 | Housey et al. | |
| 5,721,827 A | 2/1998 | Logan et al. | |
| 5,724,567 A | 3/1998 | Rose et al. | |
| 5,742,599 A | 4/1998 | Lin et al. | |

(Continued)

FOREIGN PATENT DOCUMENTS

EP  0 992 921  4/2000

(Continued)

OTHER PUBLICATIONS

G. Degoulet et al., EPEOS—Automatic Program Recording System, Nov. 1975, 22 pgs.

(Continued)

*Primary Examiner* — Craig A. Renner

(57) ABSTRACT

A mounting system for a media playback device is provided having an outer module for rigidly mounting the media playback device to a surface, and a corresponding cartridge which is capable of being inserted and removed from the outer module. While inserted in the outer module, a first mounting subsystem functions to fixedly mount the cartridge within the outer module such that shock, vibration, and other physical environmental factors are not amplified in the cartridge. A second mounting subsystem is provided to protect the cartridge while removed from the outer module, and generally comprises a resilient material around a portion of the cartridge.

23 Claims, 31 Drawing Sheets

U.S. PATENT DOCUMENTS

| | | | |
|---|---|---|---|
| 5,758,257 A | 5/1998 | Herz et al. |
| 5,790,935 A | 8/1998 | Payton |
| 5,793,980 A | 8/1998 | Glaser et al. |
| 5,884,028 A | 3/1999 | Kindell et al. |
| 5,926,624 A | 7/1999 | Katz et al. |
| 5,991,306 A | 11/1999 | Burns et al. |
| 6,005,566 A | 12/1999 | Jones et al. |
| 6,263,503 B1 | 7/2001 | Margulis |
| 6,271,989 B1 | 8/2001 | Tannert |
| 6,324,054 B1 | 11/2001 | Chee et al. |
| 6,434,747 B1 | 8/2002 | Khoo et al. |
| 6,453,355 B1 | 9/2002 | Jones et al. |
| 6,491,194 B2 | 12/2002 | Marvin |
| 6,526,581 B1 | 2/2003 | Edson |
| 6,614,751 B1 | 9/2003 | Katao |
| 6,678,215 B1 | 1/2004 | Treyz et al. |
| 6,678,737 B1 | 1/2004 | Bucher |
| 6,700,893 B1 | 3/2004 | Radha et al. |
| 6,708,213 B1 | 3/2004 | Bommaiah et al. |
| 6,717,952 B2 | 4/2004 | Jones et al. |
| 6,744,763 B1 | 6/2004 | Jones et al. |
| 6,826,283 B1 | 11/2004 | Wheeler et al. |
| 6,829,648 B1 | 12/2004 | Jones et al. |
| 7,117,516 B2 | 10/2006 | Khoo et al. |
| 7,191,242 B1 | 3/2007 | Serenyi et al. |
| 7,366,788 B2 | 4/2008 | Jones et al. |
| 2002/0030921 A1* | 3/2002 | Hashizume et al. ....... 360/97.01 |
| 2002/0056112 A1 | 5/2002 | Dureau et al. |

FOREIGN PATENT DOCUMENTS

| | | |
|---|---|---|
| EP | 0 909 112 | 1/2004 |
| JP | 10-261254 | 9/1998 |
| WO | WO-99/18506 | 4/1999 |
| WO | WO-00/23899 | 4/2000 |
| WO | WO-00/49731 | 8/2000 |
| WO | WO-01/10124 | 2/2001 |
| WO | WO-01/47192 | 6/2001 |

OTHER PUBLICATIONS

PR Newswire, New Company Xenote Allows Consumers to 'Bookmark the Real World' with Fun, Personal Internet Device, Jan. 25, 2000, 2pgs.

Tivo, Inc., Form S-1, Jul. 22, 1999, 902 pgs.

\* cited by examiner

SYSTEM AND METHOD FOR PROTECTING REMOVEABLE MEDIA PLAYBACK DEVICES

CROSS-REFERENCE TO RELATED PATENT APPLICATIONS

This application is a Continuation of U.S. application Ser. No. 11/018,297, filed Dec. 21, 2004, incorporated herein by reference in its entirety, which claims priority from Provisional Application U.S. Application 60/532,056, filed Dec. 24, 2003, incorporated herein by reference in its entirety.

BACKGROUND OF THE INVENTION

The following relates generally to media playback devices and, more particularly, to media playback devices that are removably mounted in an automobile, recreational vehicle, boat, aircraft, or other vehicle.

Typical media playback devices (e.g., stereos, CD/DVD players/changers, televisions, VCRs, hard disk drive (HDD) based systems, etc.) have been adapted for use in cars and other vehicles. Because shock, vibration, and other physical environmental factors inherent in vehicles can adversely affect playback and operation of such devices, various mounting, housing, and/or bracing systems (collectively "mount" or "mounting system") have been adopted for use in protecting and resiliently holding the media playback systems during use. While some mounting systems are intended to permanently fix a subject media playback device in a vehicle, many such mounting systems have further been adapted such that they allow for relatively easy selective removal of a media playback device by a user for portable use, theft deterrence, updating of content, and other functions. Accordingly, while removable media playback devices may be protected and resiliently held while inserted in a corresponding mount affixed to the vehicle, such playback devices are susceptible to breakage or damage from drops and other shocks while removed from their mount. It will be appreciated that the risk of such damage with media playback devices having removable HDDs is significant as the complex componentry of hard drives make them inherently susceptible to damage from drops/shocks.

Accordingly, it is desired to provide an improved mounting system for resiliently holding and protecting a media playback device while removable portions are in both inserted and removed states.

SUMMARY OF THE INVENTION

In accordance with this and other needs, the following generally discloses a removable media playback unit which is rigidly contained in an enclosure that is in turn rigidly and removably mounted into a processor module computer device that is fixedly mounted in a vehicle. The media playback unit enclosure also includes an elastomeric outer covering. When the media playback unit is locked in the processor module, it is held rigid with respect to the frame of the vehicle, therefore shock, vibration, and other physical environmental factors are not generally amplified by the elasticity of the outer covering. When the media playback unit is removed from the fixedly mounted processor module, the outer elastomeric covering is, however, operative to absorb a substantial amount of the impulse load if the media playback unit is dropped onto a firm surface, thereby generally protecting the media playback unit from damage and breakage.

A better appreciation of the objects, advantages, features, properties, and relationships of the disclosed media playback device mounting systems will be obtained from the following detailed description and accompanying drawings which set forth illustrative embodiments which are indicative of the various ways in which the principles described hereinafter may be employed.

BRIEF DESCRIPTION OF THE DRAWINGS

For use in better understanding of the exemplary media playback device mounting system described hereinafter reference may be had to the following drawings in which.

DETAILED DESCRIPTION OF THE PREFERRED EMBODIMENTS

The present invention can find utility in a variety of implementations without departing from the scope and spirit of the invention, as will be apparent from an understanding of the principles that underlie the invention. Reference is made throughout this description of the invention to a HDD-based media device installed in an automobile, and associated mounting systems and hardware, however, it is understood that the particular removable media system may be applied for media playback devices of any kind which require mounting and protective functions in both removed and inserted states in any type of vehicle or mounting location. It will also be understood that while the present invention is explained in reference to the playback of audio files from the HDD-based media device (e.g., audio having a MP3 format), it will nonetheless have broad application in all areas of media playback from a removable device (e.g., video content, map/navigation information, photos, etc.). Additionally, application of the invention is not intended to be limited solely to media playback systems, for example it may be beneficially applied to HDD or other storage devices intended for the purposes of vehicle performance monitoring, data logging, delivery receipt storage and goods tracking, passenger statistic recording, etc.

For providing mounting and protective functions in HDD cartridge 200 and processor module 100 while HDD cartridge is in both inserted and removed states with respect to the processor module, the following discloses a mounting and protective system for fixedly mounting the HDD cartridge and processor module to an automobile while allowing for the selective removal of the HDD cartridge by a user.

Figure 1:
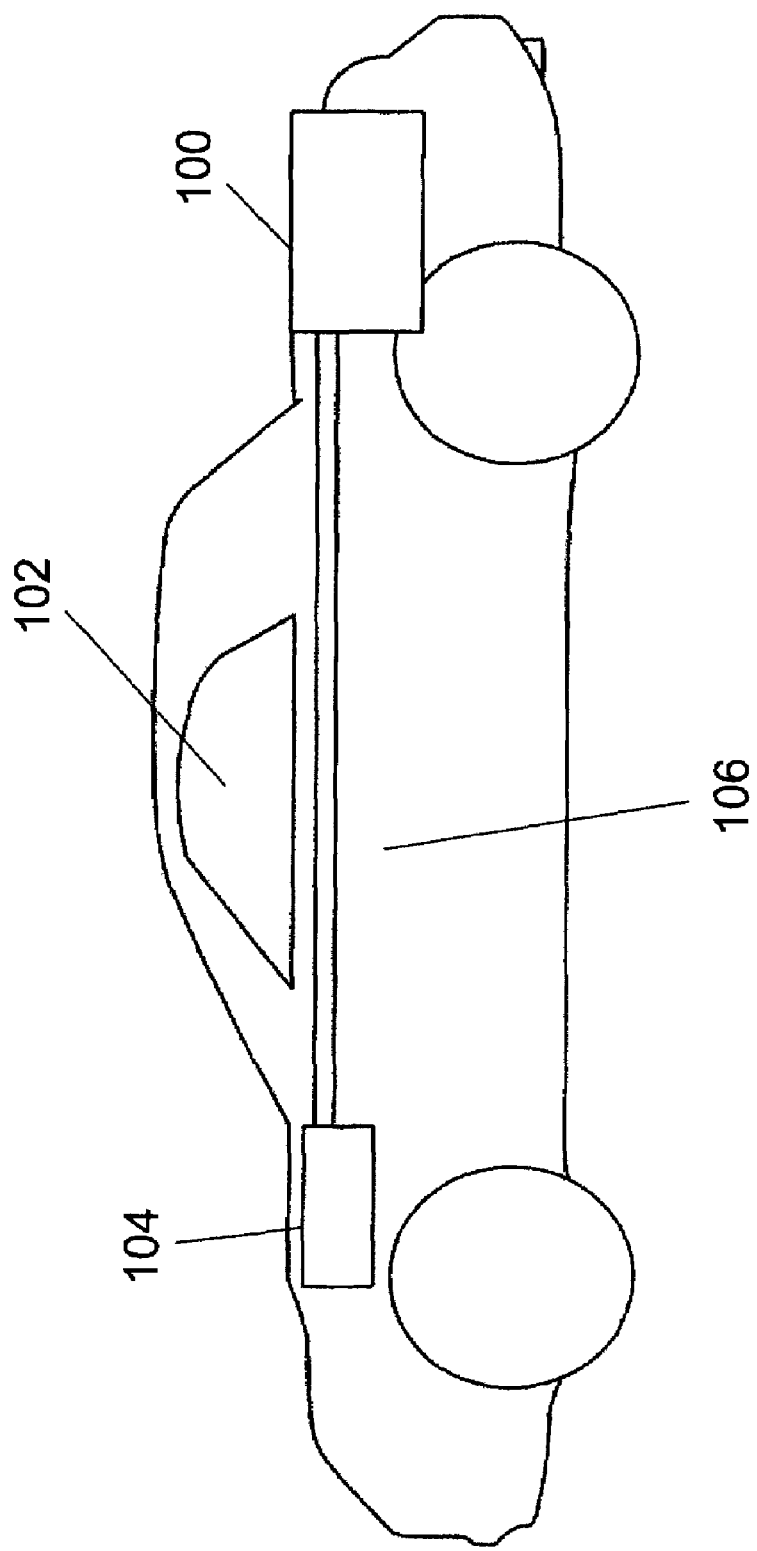
FIG. 1 illustrates a block diagram of an exemplary media playback system with the media stored on a HDD, installed in an automobile.

By way of example, FIG. 1 is a block diagram that illustrates how a hard disk drive-based media system is installed in an automobile. The installation of the current system and device is similar to installations of currently available multi-disk CD changers in automobiles. The HDD cartridge and processor module 100 are mounted in the trunk in the example shown in FIG. 1, but may be located in any convenient location on or within the automobile. A control bus 102, for example an ACP system that is used in automobiles made by the Ford Motor Company, is used to send control messages from the head unit 104 to the processor module 100. The processor module decodes digital media stored on the HDD 702 and converts the decompressed media into analog voltage fluctuations that are line level voltages, which are input into an automobile head unit 104 via a line level connection 106. The head unit typically includes an amplifier to amplify the line level signal. The head unit also includes a user interface for controlling the playback of the media. For example, a specific MP3 or other digital media file on HDD 702 may be selected and triggered to play back. The head unit user interface typically includes standard user interface functional control elements such as play, stop, pause, next track, last track, and the like, and also enables the user to browse or navigate through media files stored on HDD 702.

Figure 2:
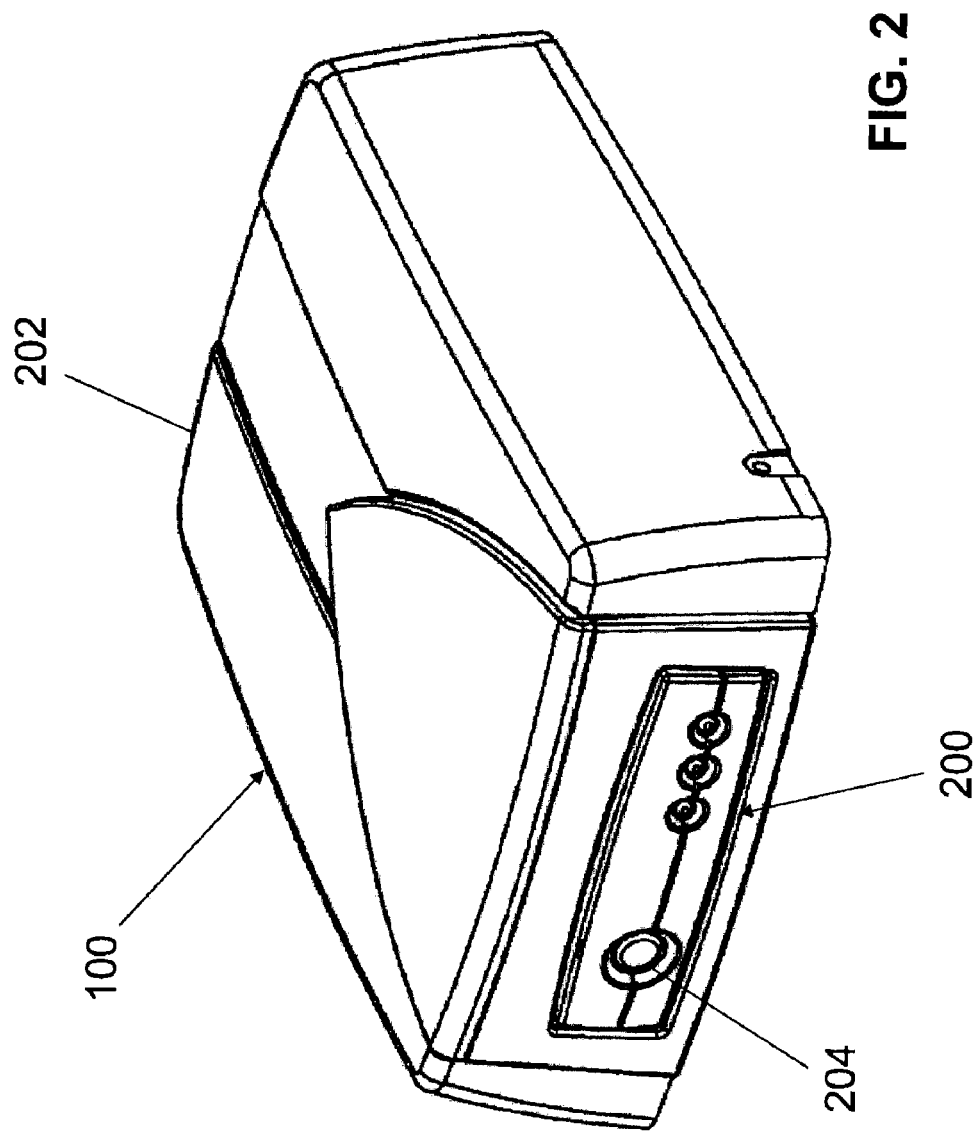
FIG. 2 illustrates an isometric front view of the HDD cartridge installed in the processor module.
Figure 3:
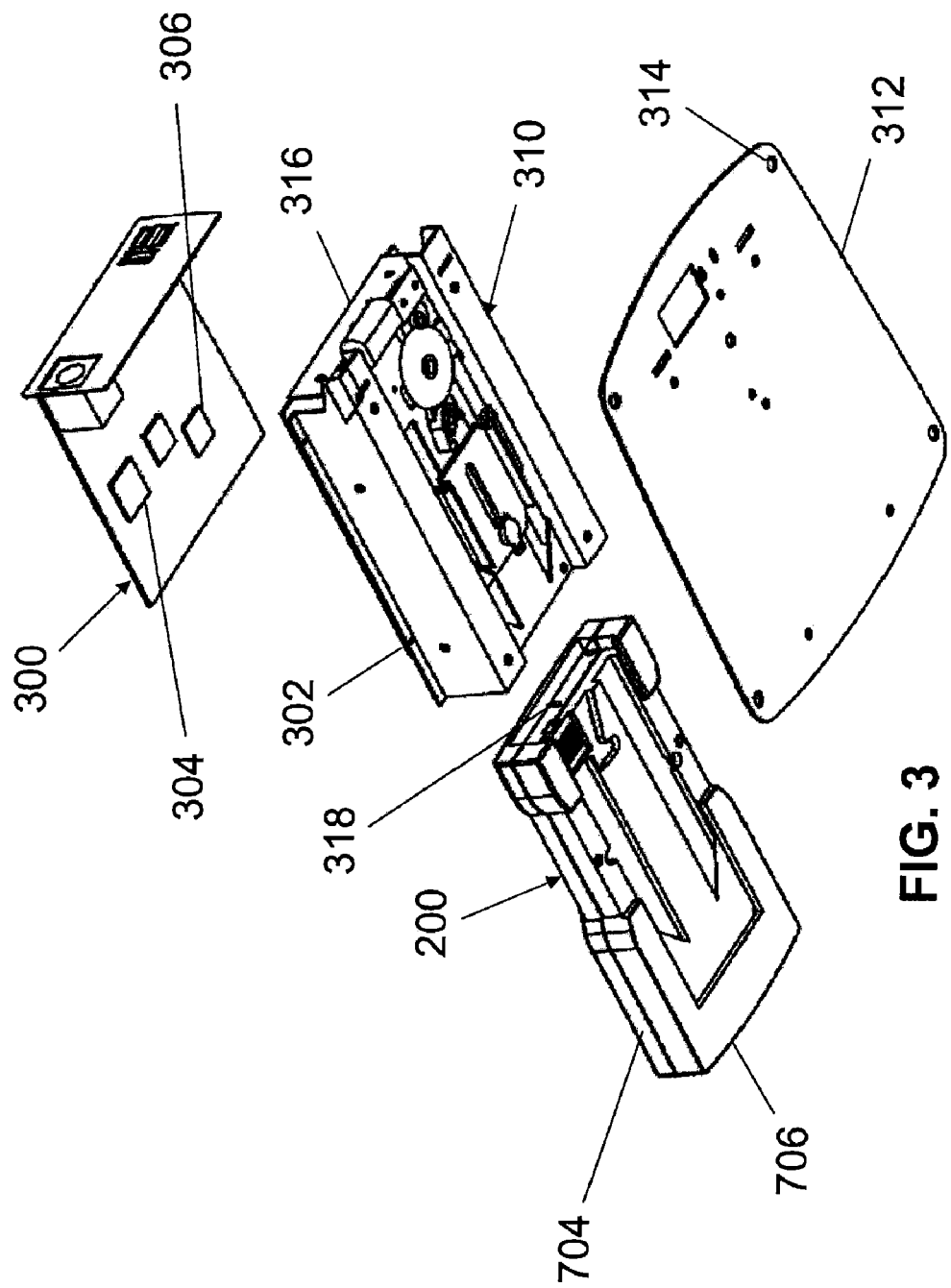
FIG. 3 illustrates an isometric exploded bottom view of the processor module subsystems and components and includes the HDD cartridge.

FIG. 2 illustrates an isometric view of the HDD cartridge 200 inserted into the processor module 100 (also referred to as the "inserted state"). FIG. 3 illustrates an exploded view of the processor module 100, including processor printed circuit board (PCB) 300 which is located on top of lockdown/eject chassis 302, and mounting plate 312 which serves to rigidly mount lockdown/eject chassis 302. Lockdown/eject chassis includes a lockdown/eject subsystem 310 as will be described later in more detail. Processor PCB 300 includes the microprocessor 304, microcontroller 306, and other components that collectively function to process (i.e., decode) the content files that are stored on HDD 702 for playback by the system. Processor PCB 300 also includes interface components that provide the functional electrical and signal interfaces to HDD 702. Microprocessor 304 also provides the logical processing of buttons and sensors related to the insertion and ejection of the HDD cartridge 200. Mounting plate 312 serves to attach the assembled system to the automobile. Top housing 202 (not illustrated in FIG. 3) functions as a cosmetic and protective outer covering for processor module 100.

Figure 4:
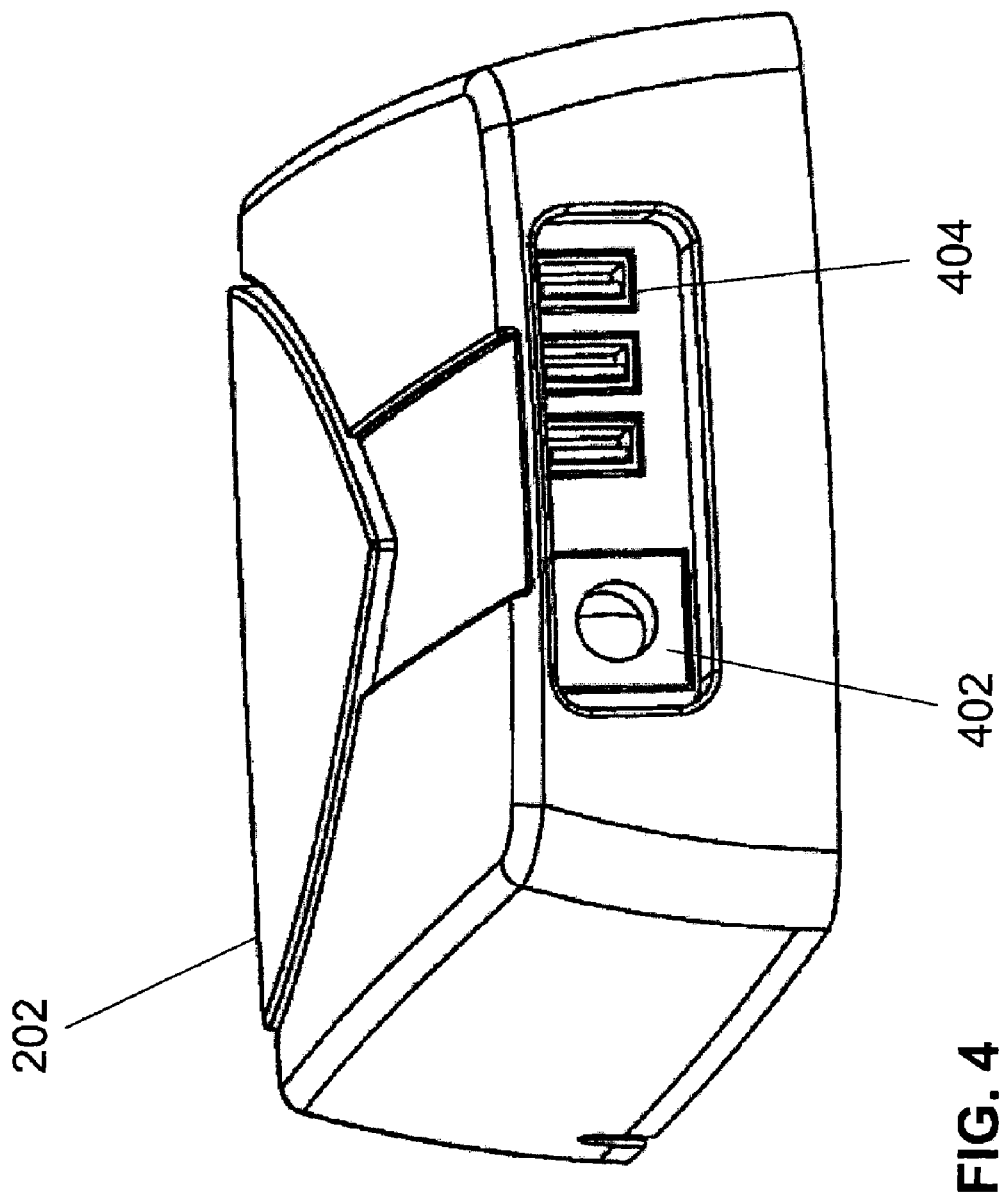
FIG. 4 illustrates an isometric rear view of the processor module showing the connectors.

FIG. 4 shows a rear view of processor module 100. A system connector 402 is provided which includes the line level audio outputs and ACP bus or other similar control interface. External USB connector(s) 404 are also included for interfacing the HDD cartridge and processor module with external devices such as computers, other media playback devices, etc. It will be understood that other connections on and inside processor module 100 and HDD cartridge 200 may be provided for interfacing with other electronic devices. It will also be understood that in this and other Figures, connecting wires, flexible circuits, and other interconnect elements that functionally connect the electronic elements are not shown so as not to obscure the details of the present invention.

Lockdown/Eject Subsystem Component Description

Referring to FIG. 3, a lockdown/eject subsystem 310 of the current embodiment is shown for providing both mechanical and electrical interface functionality when inserting and removing HDD cartridge 200 with respect to processor module 100. The components of the lockdown/eject subsystem 310 are fixedly mounted to the lockdown/eject chassis 302. The lockdown/eject chassis 302 may be fabricated out of bent sheet metal, or any other suitably rigid material including but not limited to aluminum, iron, molded plastic, etc. The HDD cartridge 200 is placed into the lockdown/eject chassis 302 during use in order to rigidly mount the HDD cartridge with respect to the frame of the automobile. The lockdown/eject chassis 302 is screwed to a mounting plate 312 which serves to rigidly mount lockdown/eject chassis 302 to the automobile body via the mounting plate 312, typically with the use of screws, bolts, rivets, or similar mounting elements through mounting holes 314 shown in FIG. 3.

Figure 5:
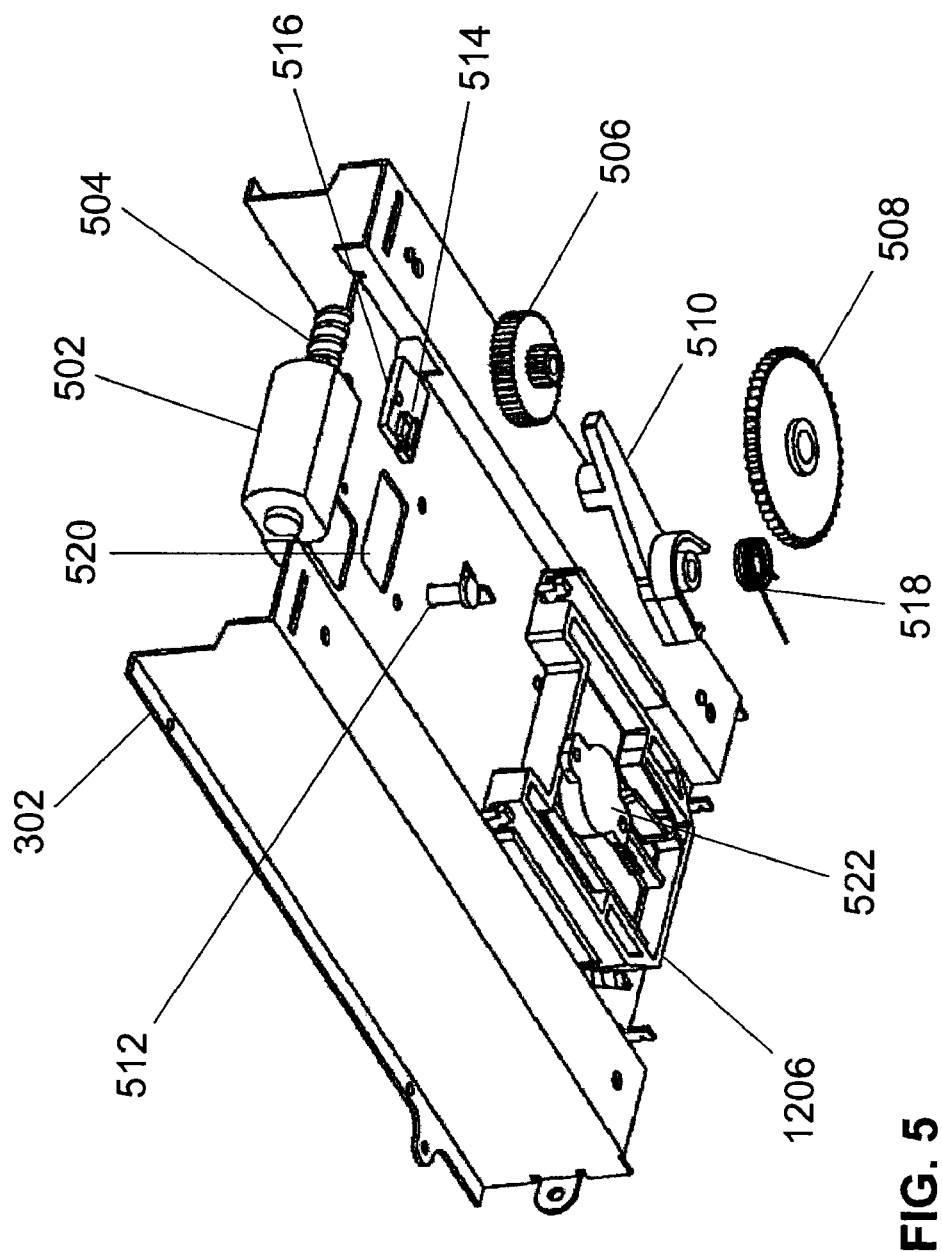
FIG. 5 illustrates an isometric bottom exploded view of an exemplary lockdown/eject subsystem.
Figure 8:
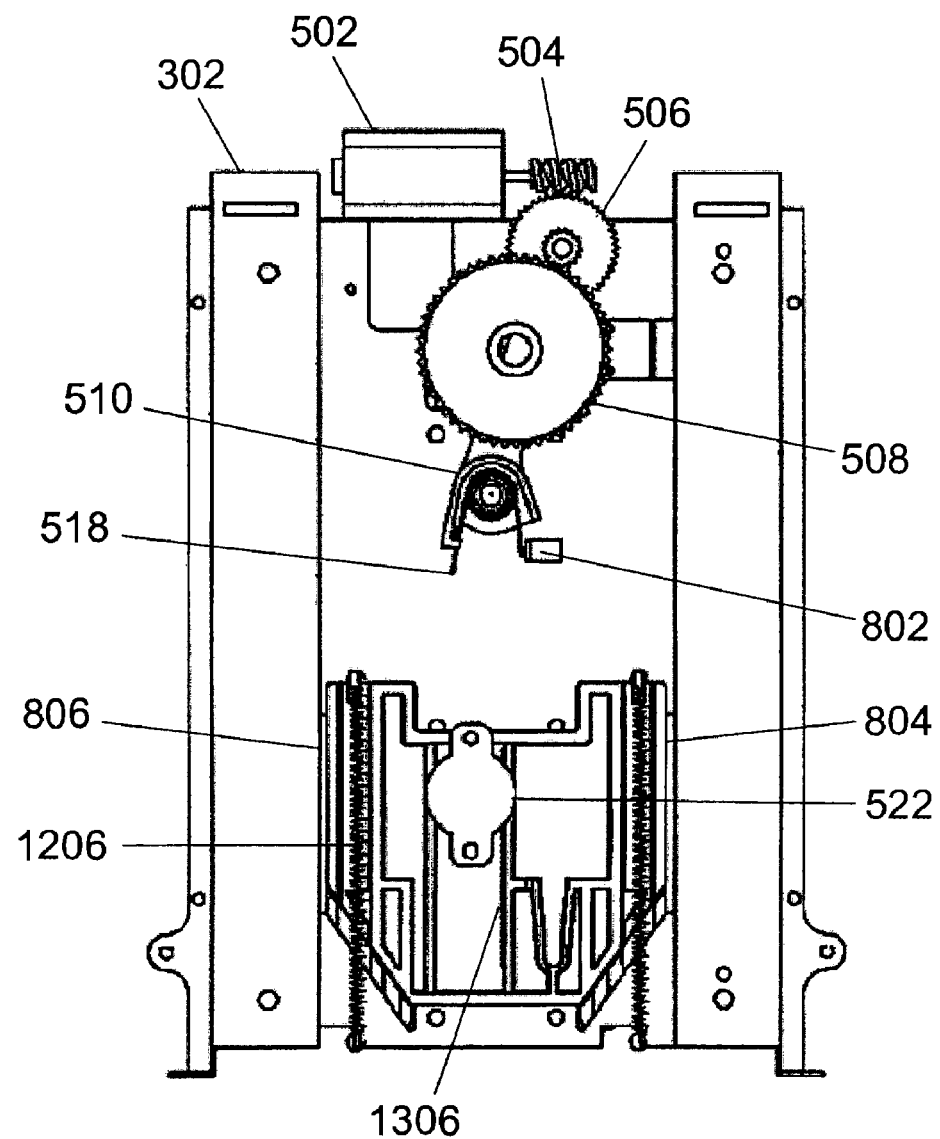
FIG. 8 illustrates an orthographic bottom view of the lockdown/eject subsystem.
Figure 14:
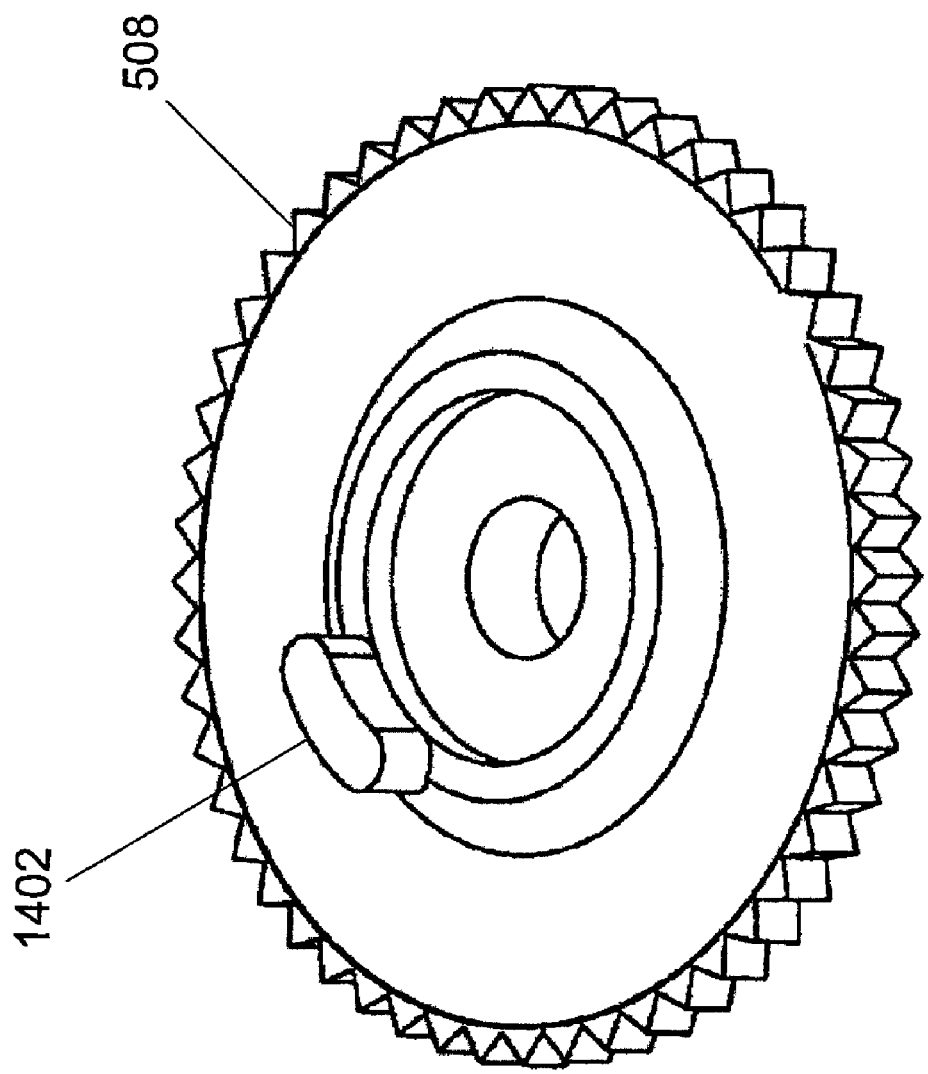
FIG. 14 illustrates an isometric top view of an exemplary spur gear.

FIG. 5 and FIG. 8 show the lockdown/eject subsystem components of the current embodiment in greater detail. A DC motor 502 with a worm 504 attached is mounted to the rear of lockdown/eject chassis 302. The worm 504 engages with step-down gear 506, which in turn engages with spur gear 508, such that when motor 502 is activated, spur gear 508 rotates but at a slower RPM than the motor. Step-down gear 506 is mounted on a pivot rod (not shown) that is connected to lockdown/eject chassis 302, and the spur gear is mounted to a pivot rod (not shown) that is connected to mounting plate 312. Latch 510 pivots on a pivot rod 512 that is connected to lockdown/eject chassis 302. Referring specifically to FIG. 5, a detector switch 514 is mounted on a detector switch PCB 516 which is in turn fixedly mounted to lockdown/eject chassis 302. FIG. 14 which illustrates spur gear 508 in greater detail shows that spur gear 508 includes a latch actuator 1402 that depresses detector switch 514 at a specific point in the spur gear rotation. Latch actuator 1402 on spur gear 508 also engages with the long edge of latch 510 and forces latch 510 to rotate at a specific point in the spur gear rotation. Referring now to FIG. 8, latch 510 is forced to pivot clockwise by latch spring 518. Latch spring 518 is located on spring hub 1102, shown in FIG. 11. Latch spring 518 is pre-loaded and bears against latch spring retainer 1104 on latch 510, shown in FIG. 11, and against spring stop 802 on lockdown/eject chassis 302, shown in FIG. 8. Locking pin 1002 (illustrated in FIG. 10) on latch 510 protrudes substantially through locking pin aperture 520 on lockdown/eject chassis 302, shown in FIG. 5.

Figure 9:
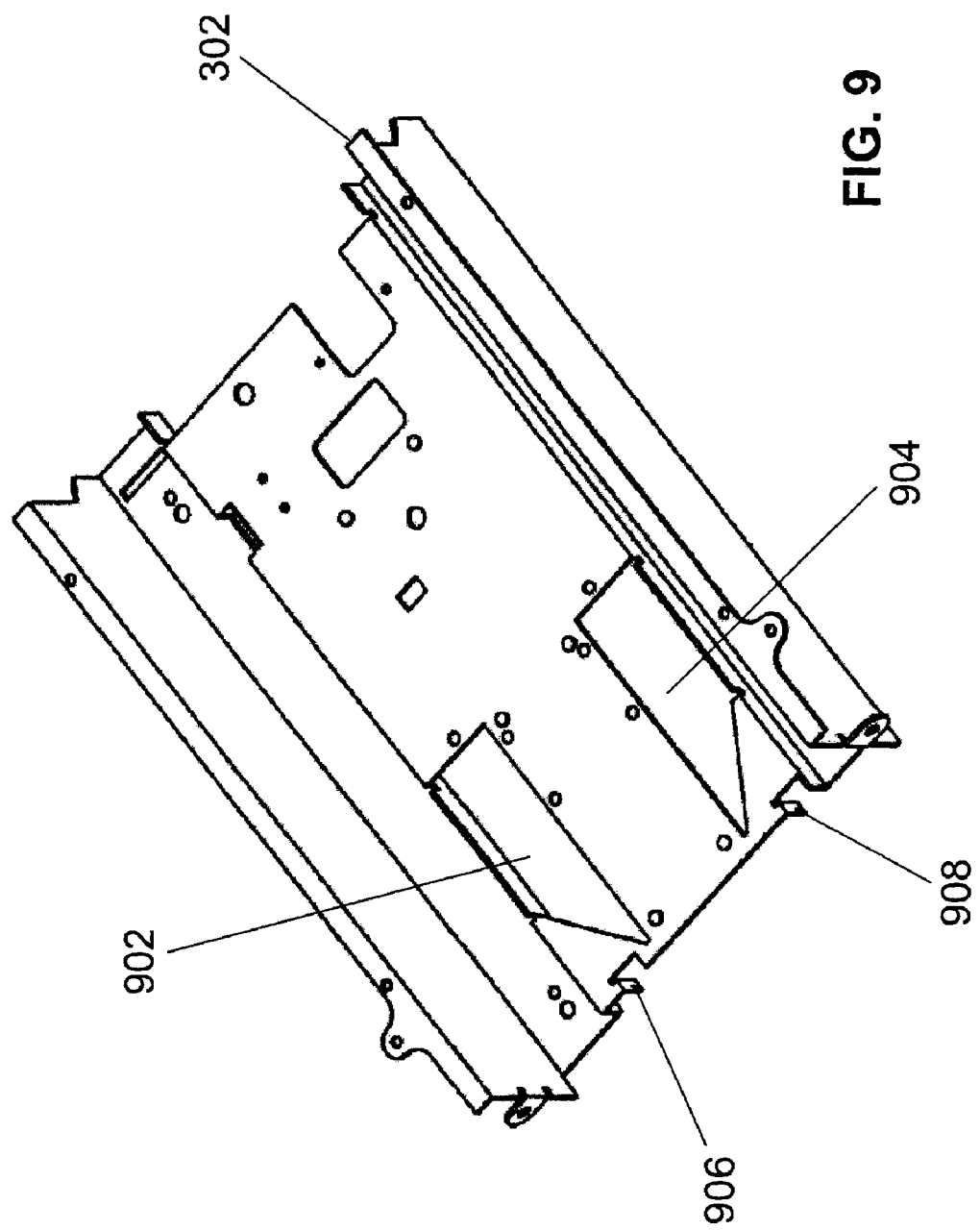
FIG. 9 illustrates an isometric top view of the lockdown-eject subsystem.
Figure 10:
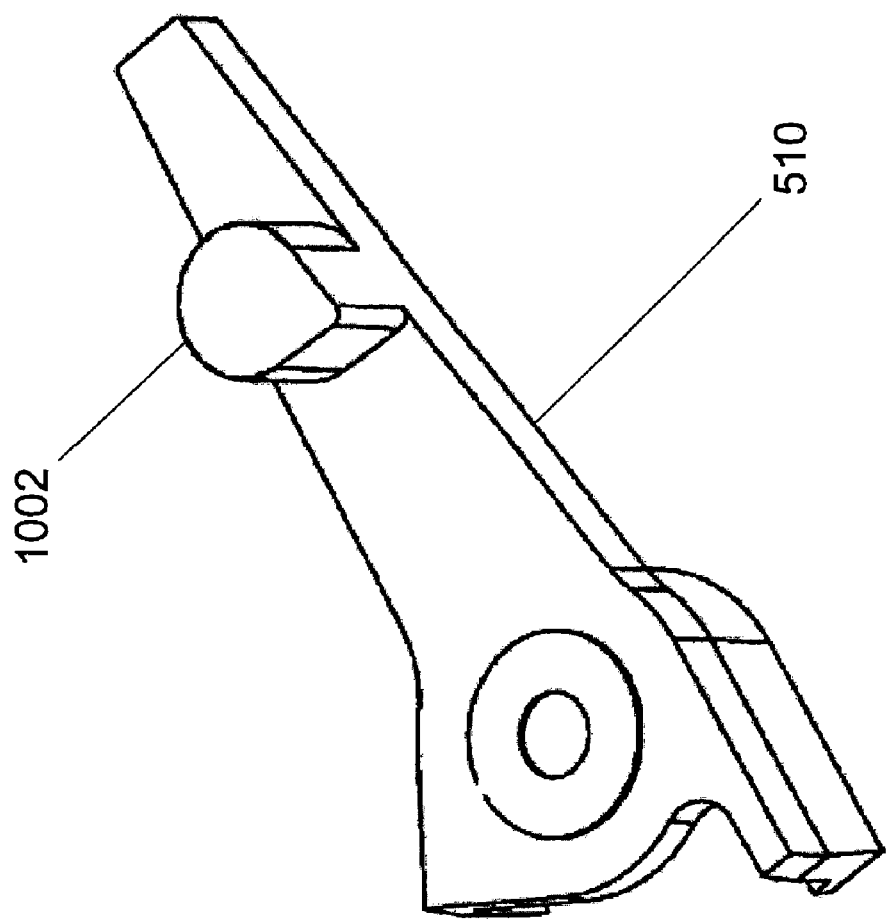
FIG. 10 illustrates an isometric top view of an exemplary latch.
Figure 11:
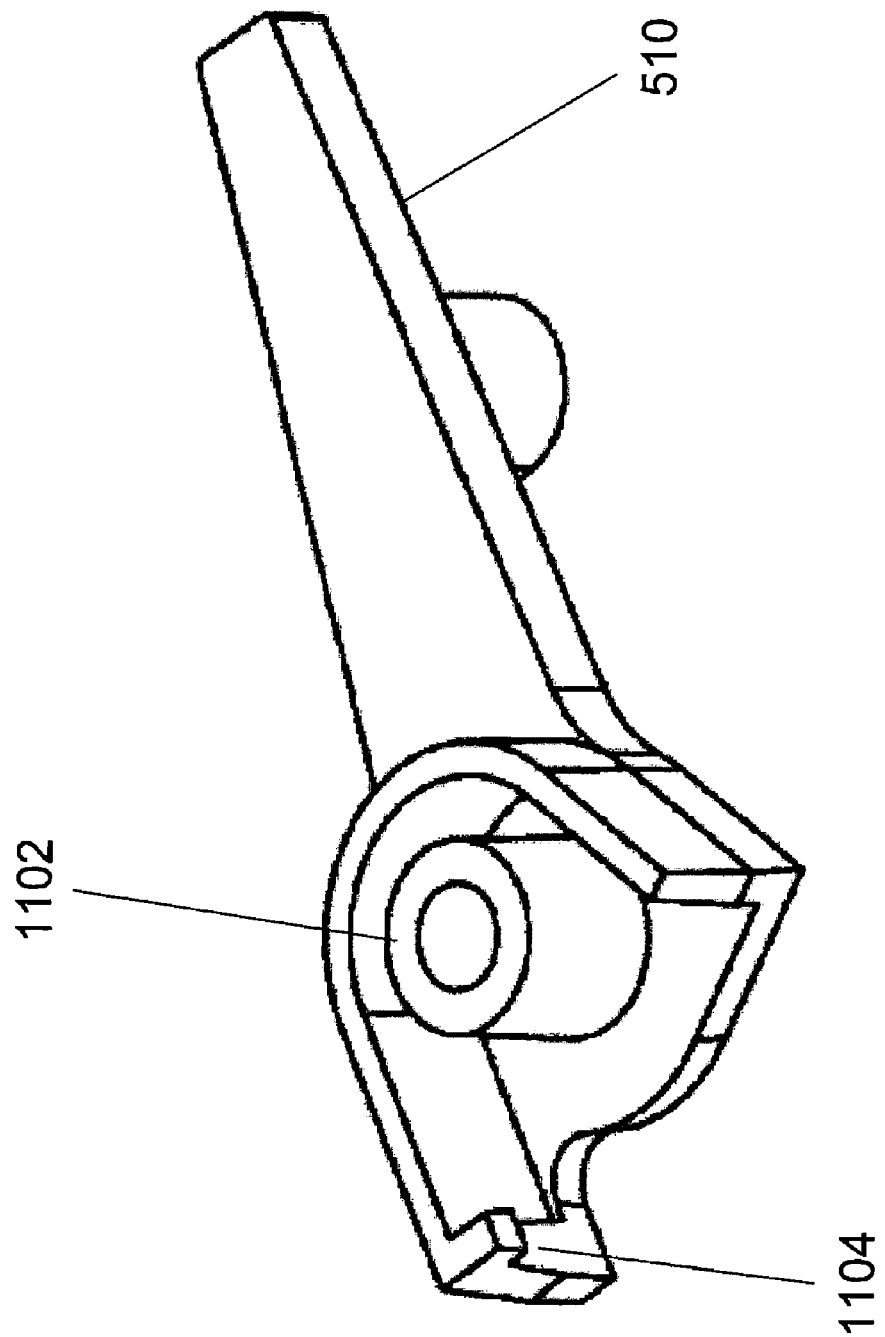
FIG. 11 illustrates an isometric bottom view of the latch.
Figure 12:
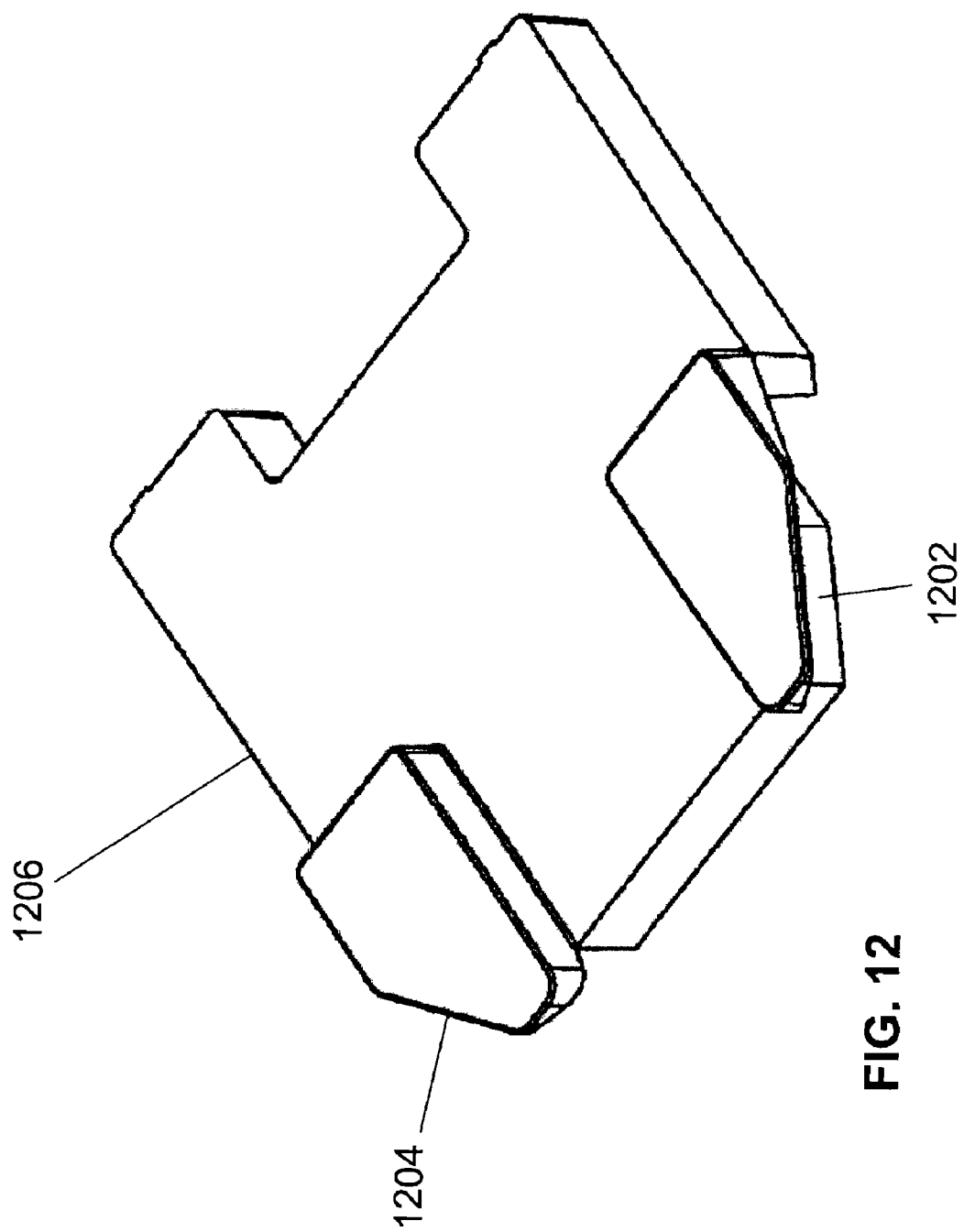
FIG. 12 illustrates an isometric top view of an exemplary pusher.
Figure 13:
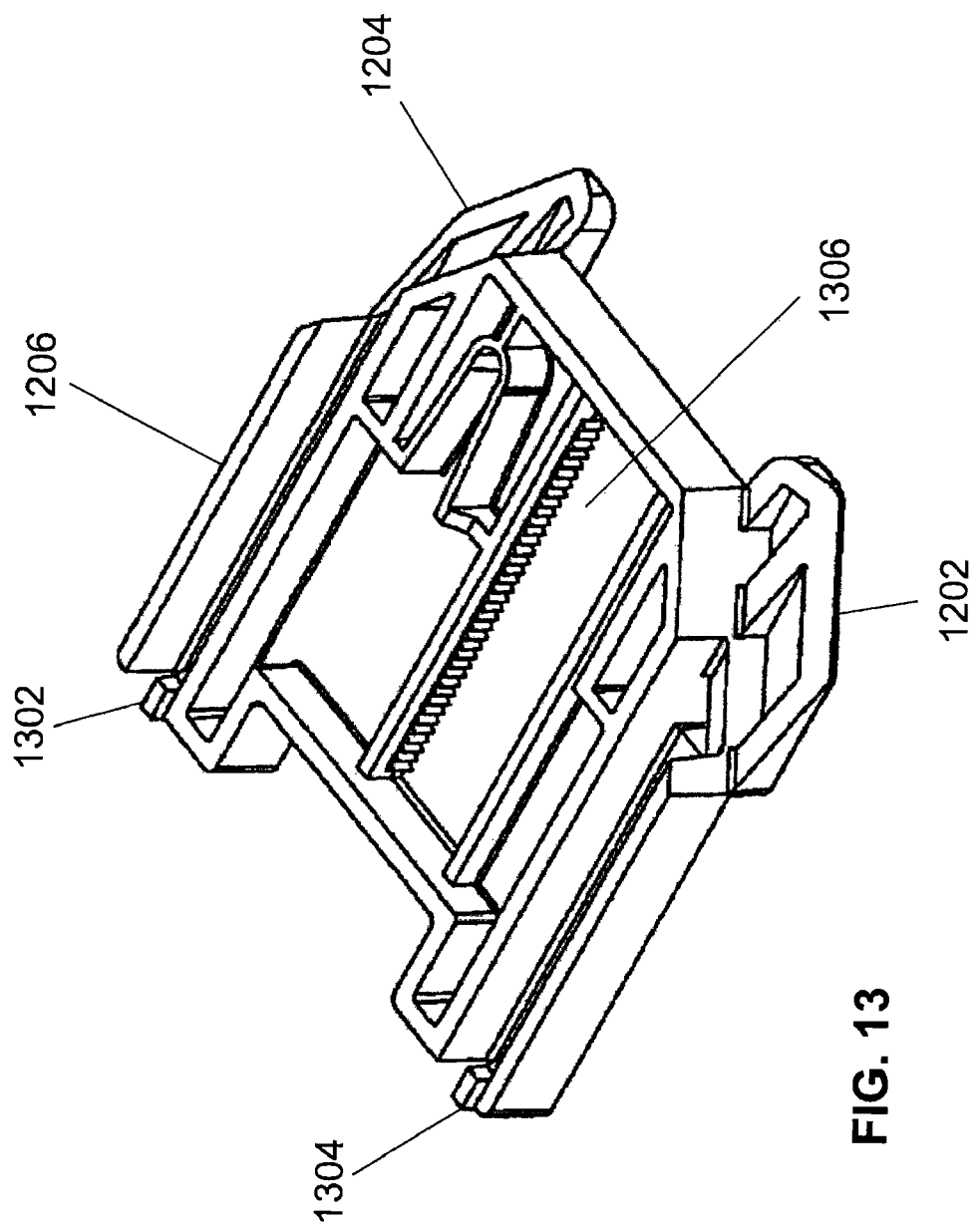
FIG. 13 illustrates an isometric bottom view of the pusher.
Figure 15:
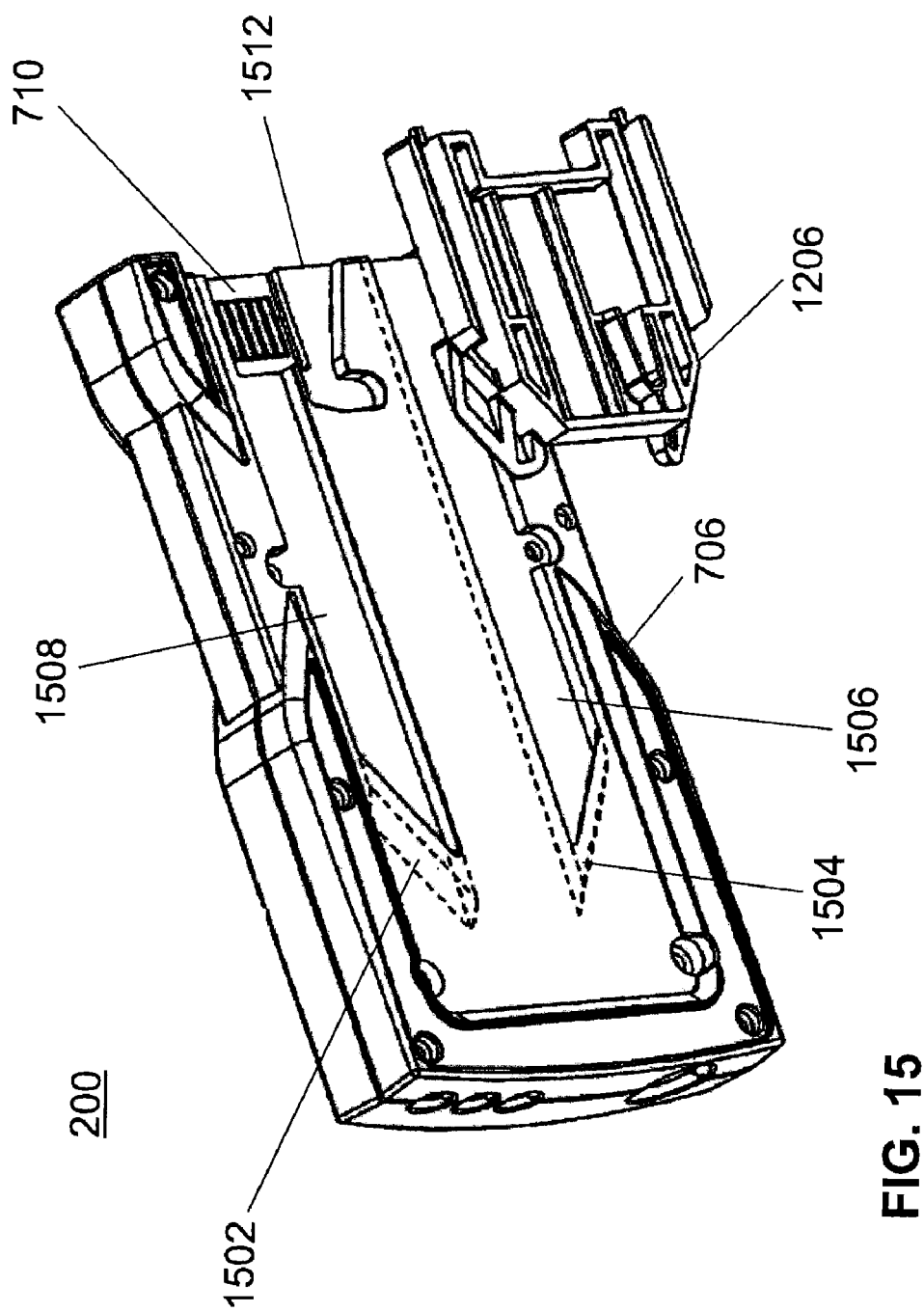
FIG. 15 illustrates an isometric view of HDD cartridge and pusher.

Referring now to FIG. 9 and FIG. 12, right bevel 1202 and left bevel 1204 on pusher 1206 protrude through pusher slots 902,904 on lockdown/eject chassis 302. Pusher 1206 slides along the length of pusher slots 902,904. Pusher 1206 is constrained in pusher slots 902,904 by lockdown/eject chassis 302 on the top surface and mounting plate 312 on the bottom surface. Pusher 1206 is also forced toward the front of processor module 100 by left pusher spring 804 and right pusher spring 806 as shown in FIG. 8. Loops at either end of pusher springs 804 and 806 attach to pusher spring hooks 906 and 908 respectively on lockdown/eject chassis 302 and right spring hook 1304 and left spring hook 1302, respectively, on the underside of pusher 1206 as illustrated in FIG. 13. Referring now to FIG. 10 and FIG. 15, latch 510 also includes a locking pin 1002 that resides at the same level as latch slot 1512 on the bottom rear area of HDD cartridge 200. As illustrated in FIG. 13, right bevel 1202 and left bevel 1204 are fabricated to have opposing angled edges for purposes of guiding and rigidly fixing HDD cartridge 200 to processor module 100 during an insertion process, as described in greater detail below.

Figure 16:
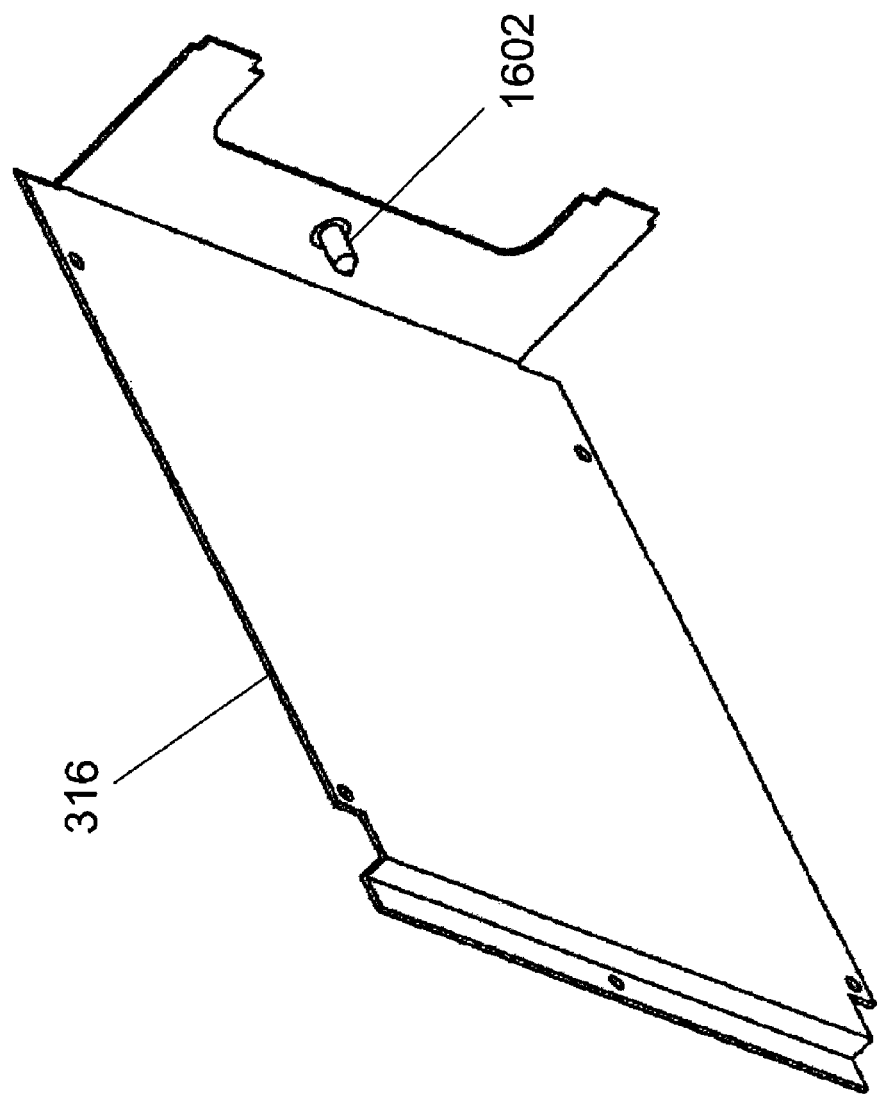
FIG. 16 illustrates an isometric view of an exemplary chassis cover with locator pin.

Referring now to FIG. 3 and FIG. 16, chassis cover 316 is screwed to the top of lockdown/eject chassis 302. FIG. 16 shows that chassis cover 316 includes a locator pin 1602 that is press fit or otherwise affixed into a hole in the rear vertical surface of chassis cover 316.

Figure 17:
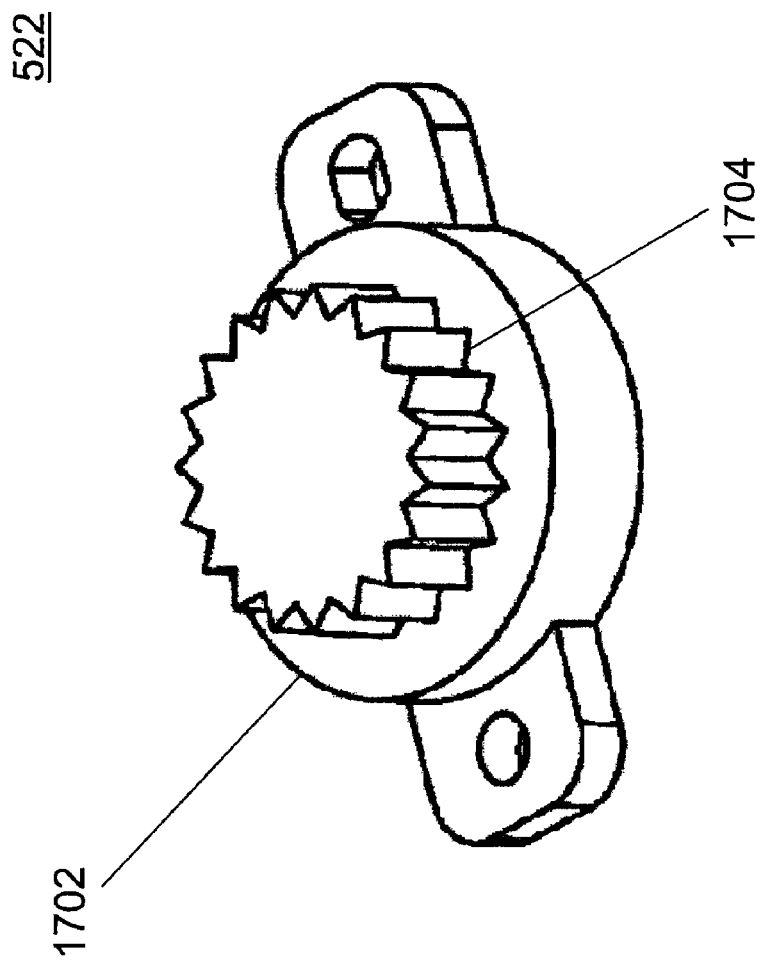
FIG. 17 illustrates an isometric view of an exemplary dampener.

A dampener 522 is located on the underside of pusher 1206 and is mounted with screws, bolts, or other fastening elements to mounting plate 312 as illustrated in FIG. 5 and FIG. 8. FIG. 17 further illustrates dampener 522, which includes a dampener gear 1704 connected to an internal rotational velocity limiting apparatus 1702. Dampener 522 is positioned so that dampener gear 1704 is engaged with dampener rack 1306 on the underside of pusher 1206 as illustrated in FIG. 8.

HDD Cartridge Component Description

Figure 6:
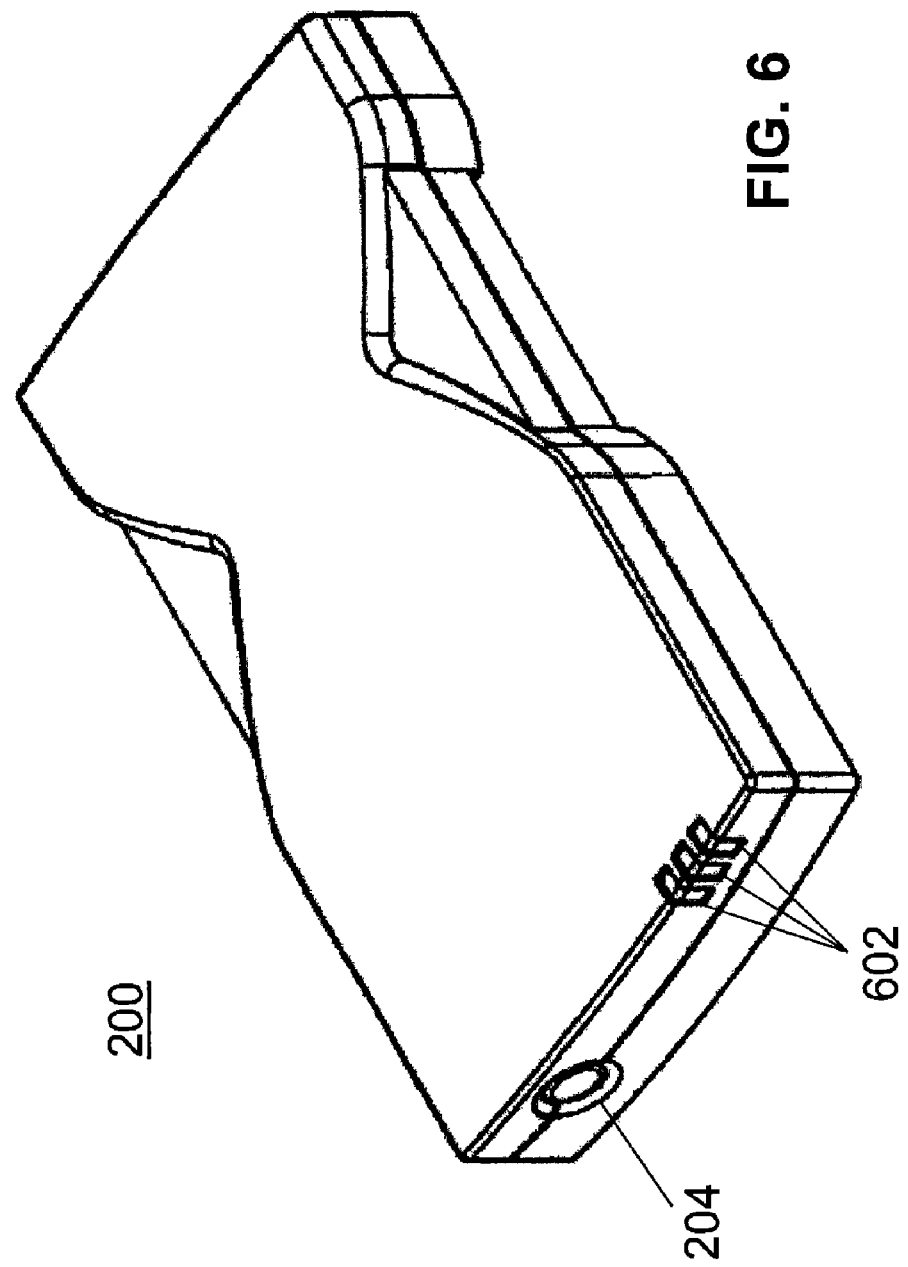
FIG. 6 illustrates an isometric top view of the HDD cartridge.
Figure 7:
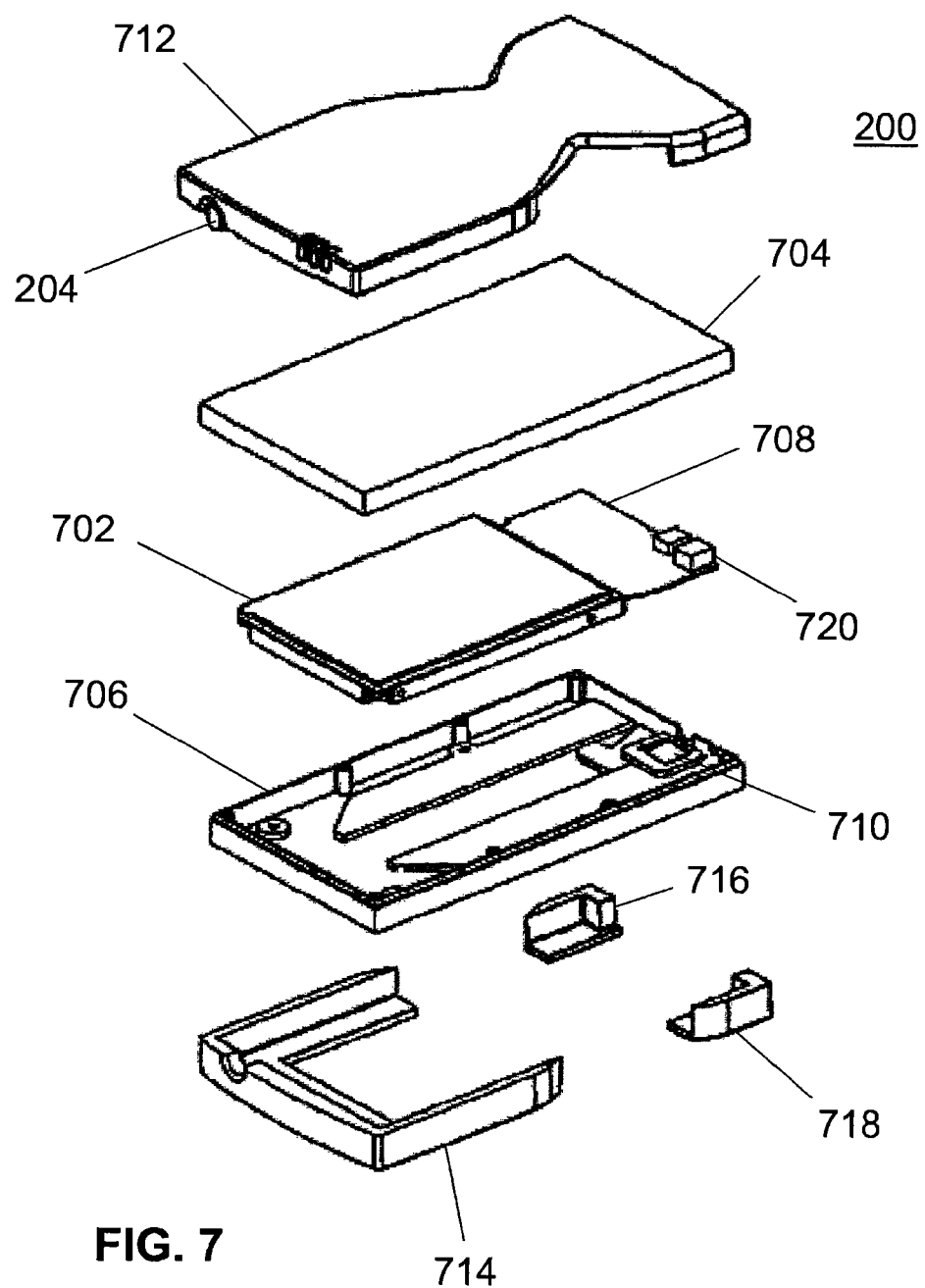
FIG. 7 illustrates an isometric exploded top view of the HDD cartridge.

Looking now to FIG. 6, a top isometric view of cartridge 200 is illustrated. FIG. 7 illustrates an exploded assembly view of the HDD cartridge 200. The HDD 702 is rigidly contained in an enclosure formed by the cartridge top housing 704 and cartridge bottom housing 706, which are typically manufactured out of injection molded polycarbonate plastic. A cartridge PCB 708 includes electronic components that provide the electrical and functional interface to the processor module 100. Connectors 710 and 720 are included on cartridge PCB 708 for connecting to the processor module and also for connecting to a PC or other computing device when the HDD cartridge is removed from the processor module. The cartridge top housing and cartridge bottom housing are fastened together with screws, bolts, or other similar fastening elements. The top cushion 712 bottom front cushion 714, right rear cushion 718, and left rear cushion 716 are injection molded out of a thermo-plastic elastomer (TPE) material, such as Santoprene, provided by Monsanto, Inc. of St. Louis, Mo. The durometer of the thermo-plastic elastomer of the described, exemplary embodiment is approximately SHORE A 50. Top cushion 712, bottom front cushion 714, right rear cushion 716, and left rear cushion 718 may be attached to cartridge top housing 704 and cartridge bottom housing 706 respectively, by the technique of over-molding. For example, cartridge top housing 704 is placed into a injection mold with features to hold it in place, and the top cushion 712 is molded around it. Therefore, the TPE is bonded directly to the surface of the polycarbonate, such that it is not easily removed. Overmolding is a well-known process in the high volume plastics manufacturing. It will be understood and appreciated by those skilled in the art that various other resilient materials (e.g., elastomers, plastics, rubbers, etc.) may be used for the cushion elements as described above, and likewise different well known methods of molding and/or attaching such materials to the cartridge housing may be used without departing from the spirit and scope of the present invention.

Referring now to FIG. 15, a right bevel cavity 1502 and left bevel cavity 1504 are cavities that are molded into cartridge bottom housing 706, located at the forward end of right pusher track 1508 and left pusher track 1506 respectively. Right bevel cavity 1502 is shown in greater detail in FIG. 20. The latch slot 1512 is a cavity that is molded into cartridge bottom housing 706, shown in FIG. 15. FIG. 3 shows that a locator hole 318 is molded into the rear-facing surface of cartridge top housing 704.

FIG. 2 and FIG. 7 show than an eject button 204 which is included on the front face of HDD cartridge 200, and is accessible by the user when HDD cartridge 200 is fully inserted into processor module 100. Eject button 204 is an injection-molded component that actuates an eject switch 2302, which is a surface mount single throw single pole (STSP) switch, shown in the block diagram in FIG. 23.

Description of Operation

Figure 18:
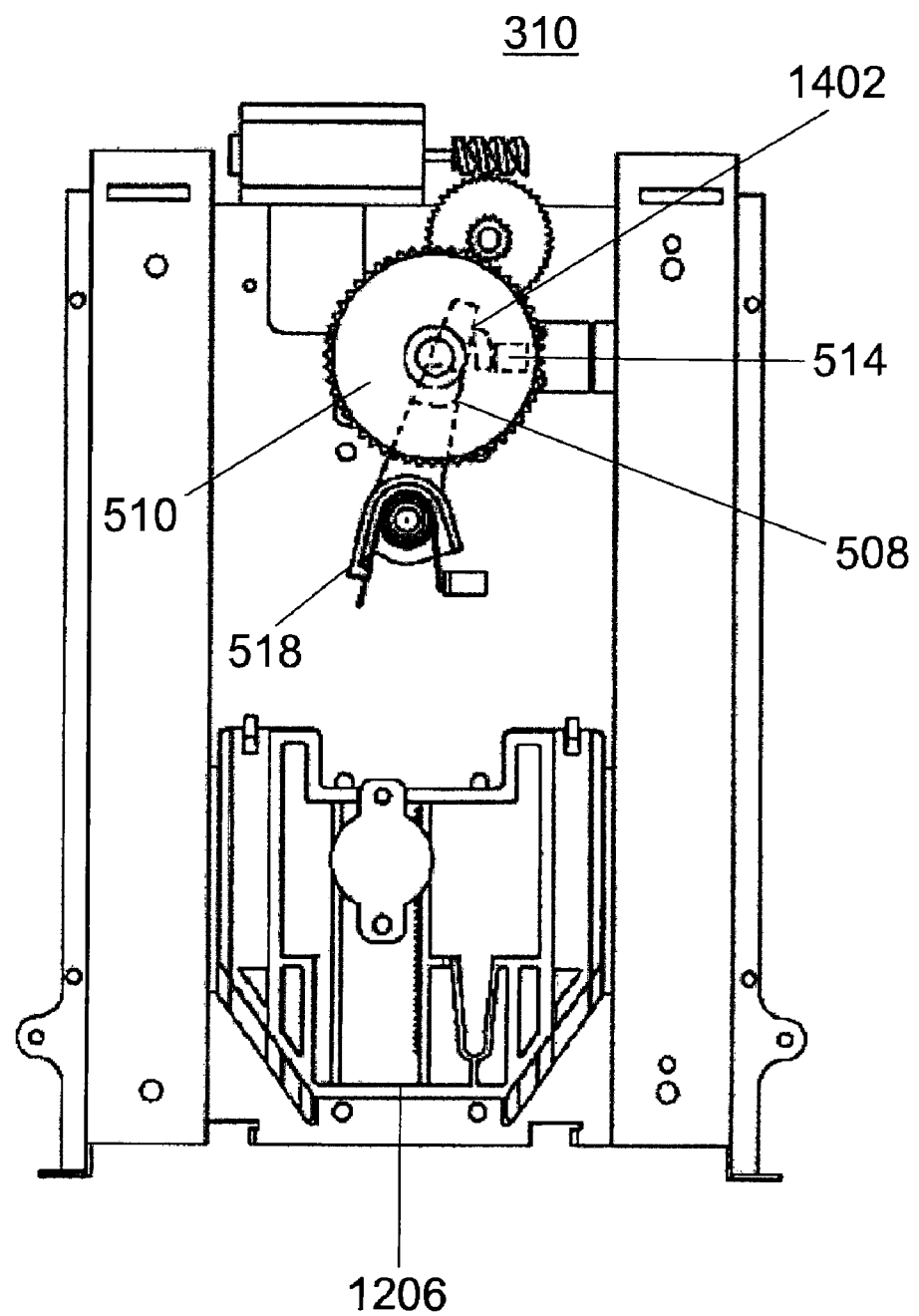
FIG. 18 illustrates an orthographic view of the lockdown/ejection subsystem in a first state.

The operation of installing or inserting the HDD cartridge 200 into processor module 100 will now be described. Referring now to FIG. 18 in an initial state (state 1), processor module 100 is ready to accept the insertion of HDD cartridge 200. FIG. 18 is an orthographic bottom view of the lockdown/eject subsystem 310 with a portion of latch 510, latch actuator 1402 on spur gear 508, and detector switch 514 all shown in dashed lines because they are hidden in this view. Pusher 1206 is forced to the front extent of its travel by left and right pusher springs 804,806 (hidden in this view). Latch 510 is forced to the clockwise extent of its rotation by latch spring 518. Latch 510 is limited in its clockwise rotation by the contact of locking pin 1002 against the right side of locking pin aperture 520 (not shown in FIG. 18 for the purpose of clarity). The latch actuator mechanism is placed in a rotational position whereby it has depressed the detector switch 514.

Figure 19:
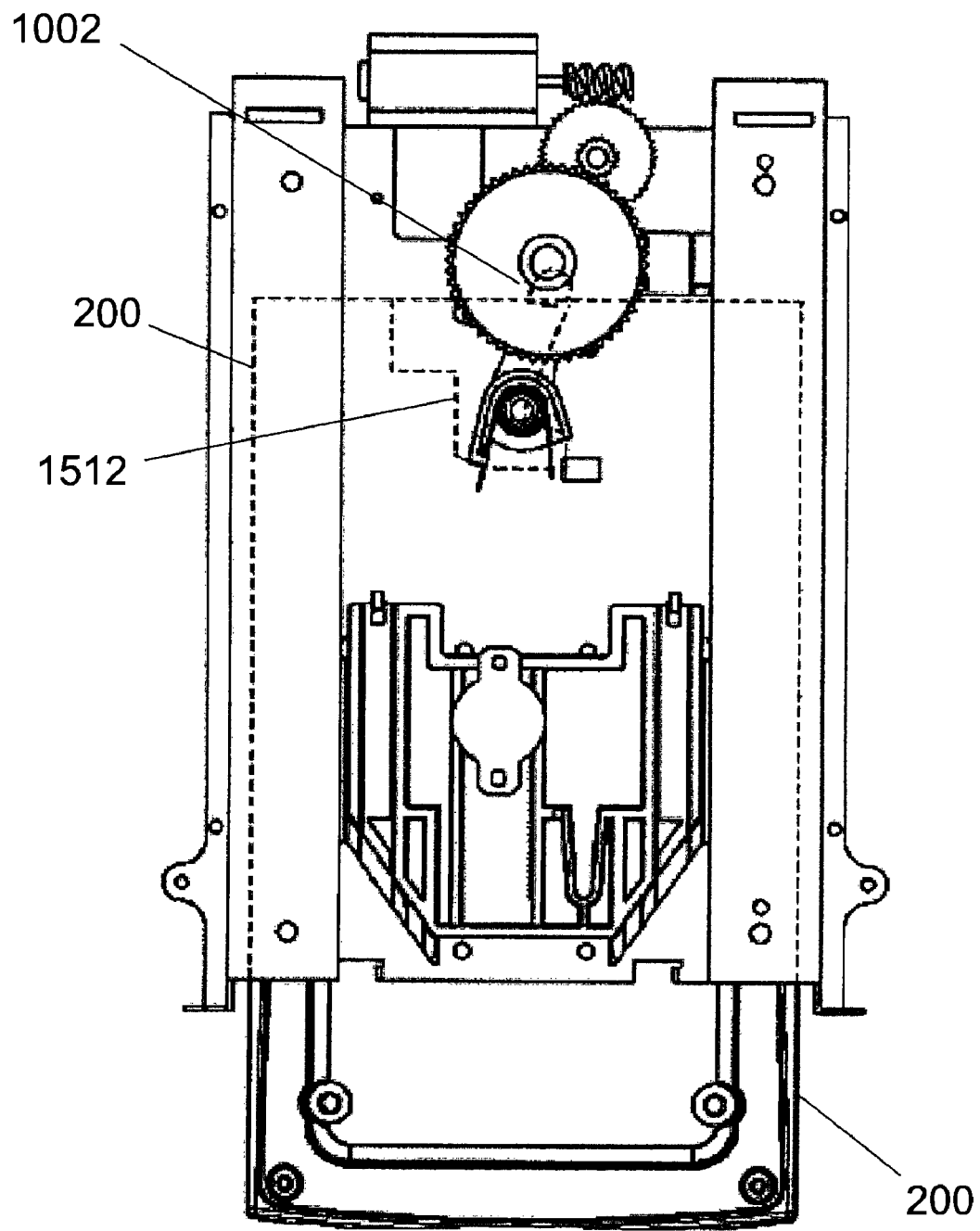
FIG. 19 illustrates an orthographic view of the lockdown/ejection subsystem and HDD cartridge in a second state.

FIG. 19 shows state 2 where HDD cartridge 200 is placed into processor module 100 by the end user. In FIG. 19, locking pin 1002 on latch 510 and latch slot 1512 on cartridge bottom housing 706 are shown as dashed lines because these features would normally be hidden in this view. Left and right pusher springs 804,806 are hidden in the view of FIG. 19, as well as other components that are not critical to explain the lockdown/eject subsystem. In state 2, locking pin 1002 on latch 510 begins to engage with latch slot 1512 on cartridge bottom housing 706. In placing HDD cartridge 200 into processor module 100, initially the right and left pusher tracks 1508, 1506 on the cartridge bottom housing align with right and left bevels 1202,1204 respectively, on pusher 1206.

Figure 20:
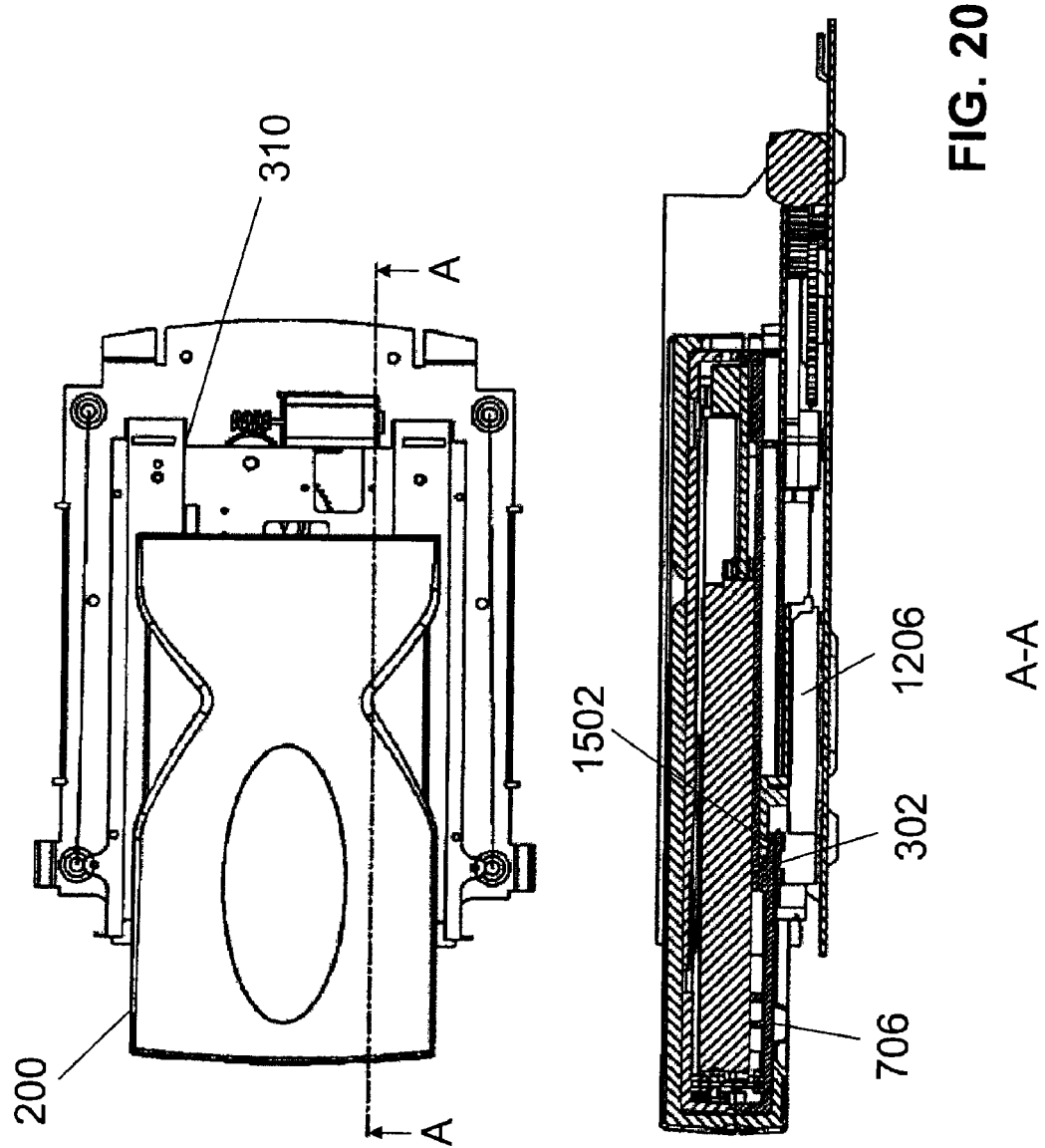
FIG. 20 illustrates a section view of HDD cartridge engaged with the pusher.

FIG. 20 is a section view taken along axis A through HDD cartridge 200 that has been initially inserted into lockdown/eject subsystem 310. As the user pushes HDD cartridge further into the processor module, (referring now to FIG. 20 and FIG. 15), right bevel 1202 and left bevel 1204 engage with right bevel cavity 1502 and left bevel cavity 1504. The action of the angled edge on right and left bevels 1202,1204 when in complete engagement with right and left bevel cavities 1502, 1504 rigidly fixes HDD cartridge 200 in lockdown/eject subsystem 310.

Figure 21:
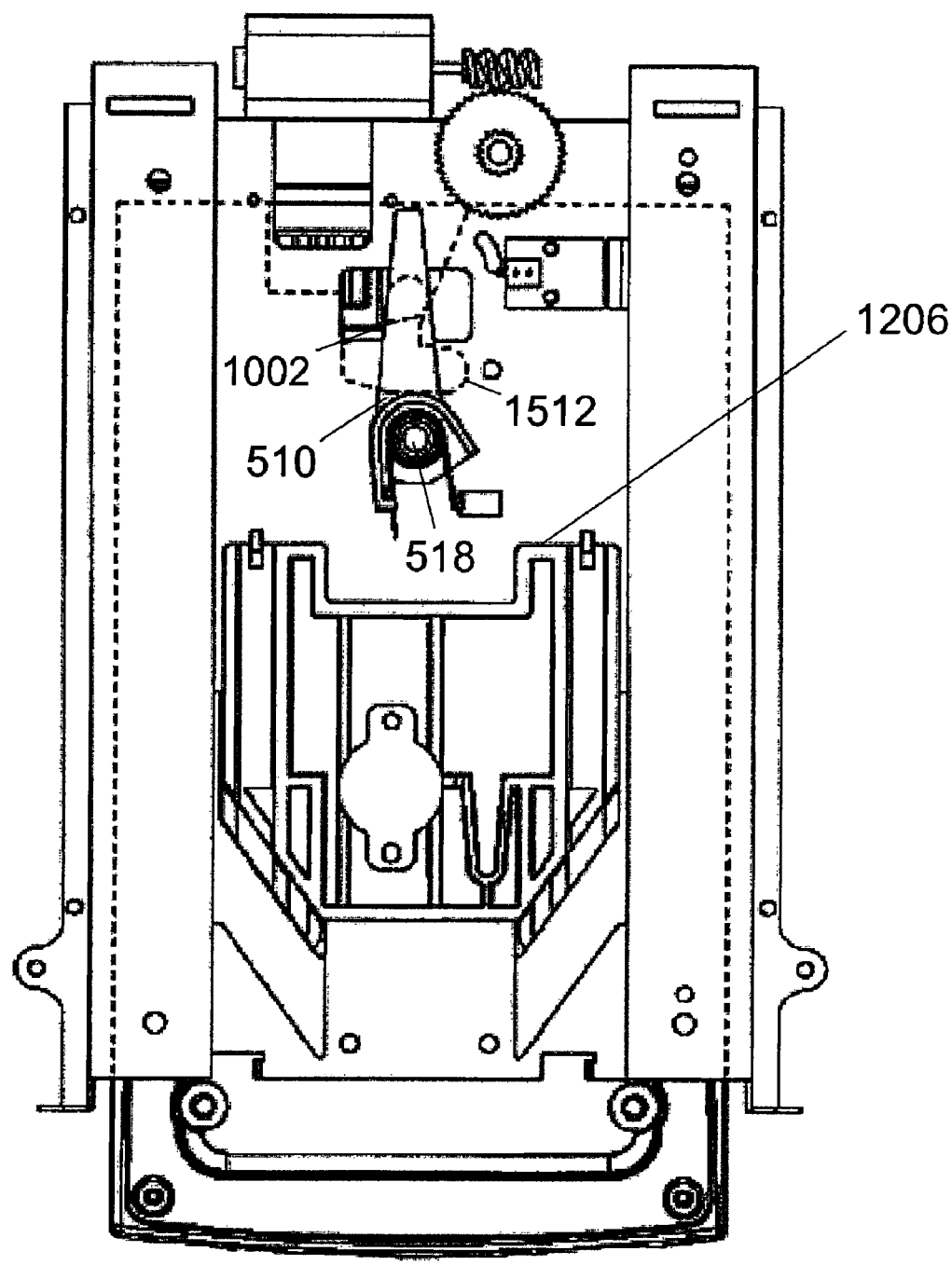
FIG. 21 illustrates an orthographic view of the lockdown/ejection subsystem and HDD cartridge in a third state.

FIG. 21 shows state 3 where HDD cartridge 200 is pushed further into processor module 100 by the user. In FIG. 21, spur gear 508 is not shown in order to more clearly reveal the mechanism. Locking pin 1002 is in contact with the right edge of latch slot 1512. Latch 510 is forced to rotate counter-clockwise as the locking pin rides down the angled right edge of latch slot 1512. Thus latch spring 518 is compressed. Left and right pusher springs 804,806 (not visible in FIG. 21) are elongated as pusher 1206 is displaced toward the rear of processor module 100.

Figure 22:
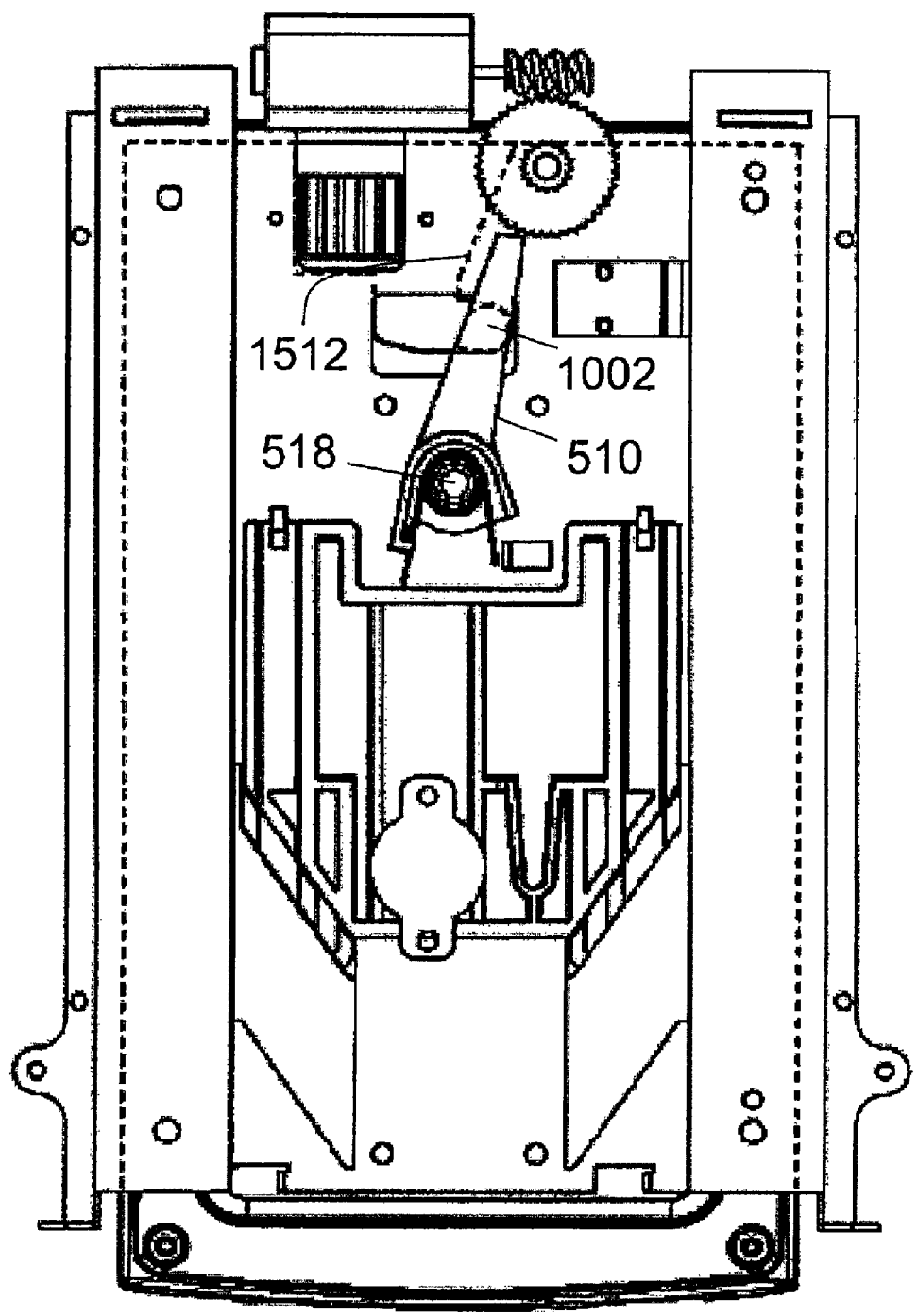
FIG. 22 illustrates an orthographic view of the lockdown/ejection subsystem and HDD cartridge in a state of complete lockdown.

FIG. 22 shows state 4 where HDD cartridge 200 is locked into processor module 100. Once again, spur gear 508 is not shown for the purpose of clarity. After locking pin 1002 clears the angled edge of latch slot 1512 on cartridge bottom housing 706, latch spring 518 forces the clockwise rotation of latch 510 such that latch pin 1002 is positioned behind a horizontal disposed portion of latch slot 1512. The position of latch pin 1002 in this portion of latch slot 1512 effectively locks HDD cartridge 200 inside processor module 100 such that HDD cartridge 200 will not become disengaged during use. The interaction of right and left bevels 1202,1204 with right and left bevel cavities 1502,1504 is to force cartridge bottom housing 706 against the metal between right pusher slot 904 and left pusher slot 902 on lockdown chassis 302. Due to this engagement of right bevel 1202 and left bevel 1204 with right bevel cavity 1502 and left bevel cavity 1504 respectively, up and down and left and right displacement of HDD cartridge 200 is generally not possible. FIG. 16 shows that chassis cover includes a locator pin 1602 while FIG. 3 shows that cartridge top housing 704 includes a corresponding molded-in locator hole 318. Locator pin 1602 and locator hole 318 are aligned such that when HDD cartridge 200 is fully inserted into processor module 100, locator pin 1602 is fully seated into locator hole 318. Thus, HDD cartridge rotation about right and left bevels 1202, 1204, or any up or down or left or right displacement of the rear portion of HDD cartridge 200 is generally prohibited. HDD cartridge 200 may thus be constrained so that it cannot generally move with respect to processor module 100 as lockdown/eject subsystem 310 will hold HDD cartridge 200 rigidly to processor module 100 even in the presence of vibration and shock transferred from the motion of the automobile chassis. Accordingly, vibrations of the automobile's chassis are generally not amplified at the HDD when the automobile is driven.

Ejection Process

There are two operational modes in which the user may activate the ejection button 204. In mode 1, the system is functioning, performing digital media decoding or writing user inputs to the hard disk drive file system. In this mode, the HDD 702 is spinning and its heads are reading from the disks and/or writing to the disks. In mode 2, the HDD 702 is not functioning and the HDD disks are not spinning.

Figure 23:
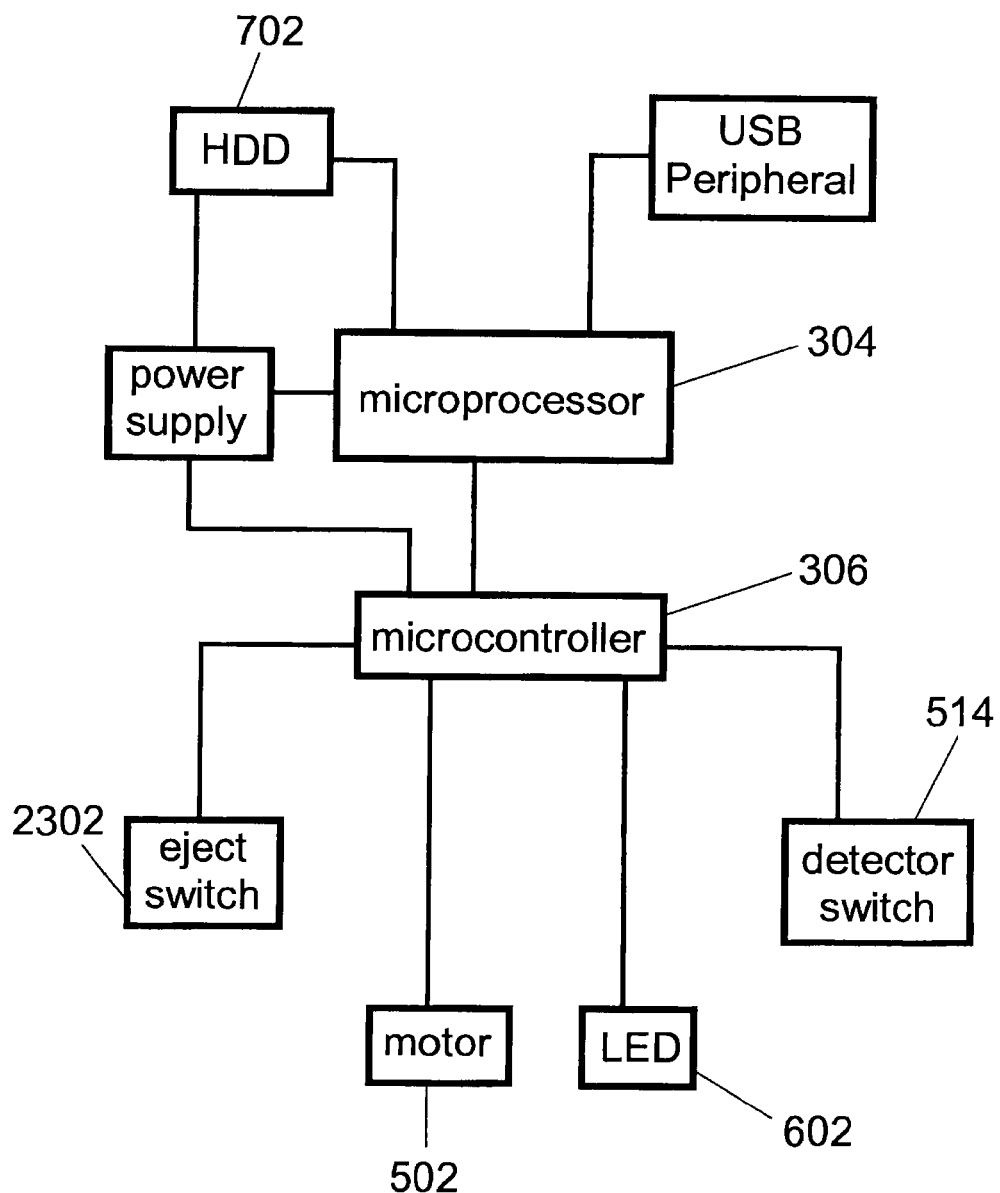
FIG. 23 illustrates a block diagram of the electronic components in the ejection electronics subsystem.

First, the ejection process will be described for mode 1. The assumed state of the mechanism is that the position of spur gear 508 is as illustrated in FIG. 18, and that HDD cartridge 200 is fully inserted so that locking pin 1002 on latch 510 is located in latch slot 1512 as shown in FIG. 22. In order to initiate the eject process, the user will activate the eject button 204 (shown in FIG. 6). FIG. 23 shows the general electronic components that are combined to make the ejection electronics subsystem. Microprocessor 304 handles media decoding and user input processing. Microcontroller 306 handles inputs from eject switch 2302 (actuated by eject button 204) and detector switch 514, and controls motor 502 and status LEDs 602. The general sequence of events that occur when eject button is activated by the user is as follows:

1. Microcontroller 306 signals to microprocessor 304 that ejection has been activated.
2. Microprocessor 304 completes processing activity including writing to HDD 702 if necessary.
3. Microprocessor 304 turns off power to HDD 702.
4. Microprocessor 304 signals to microcontroller 302 that HDD cartridge 200 is ready for ejection.
5. Microcontroller 306 activates power to motor 502 through one transition of the detector switch 514 from activated to deactivated.
6. Microcontroller 306 deactivates power to motor 502 upon transition of detector switch 514 from deactivated to activated.

Figure 24:
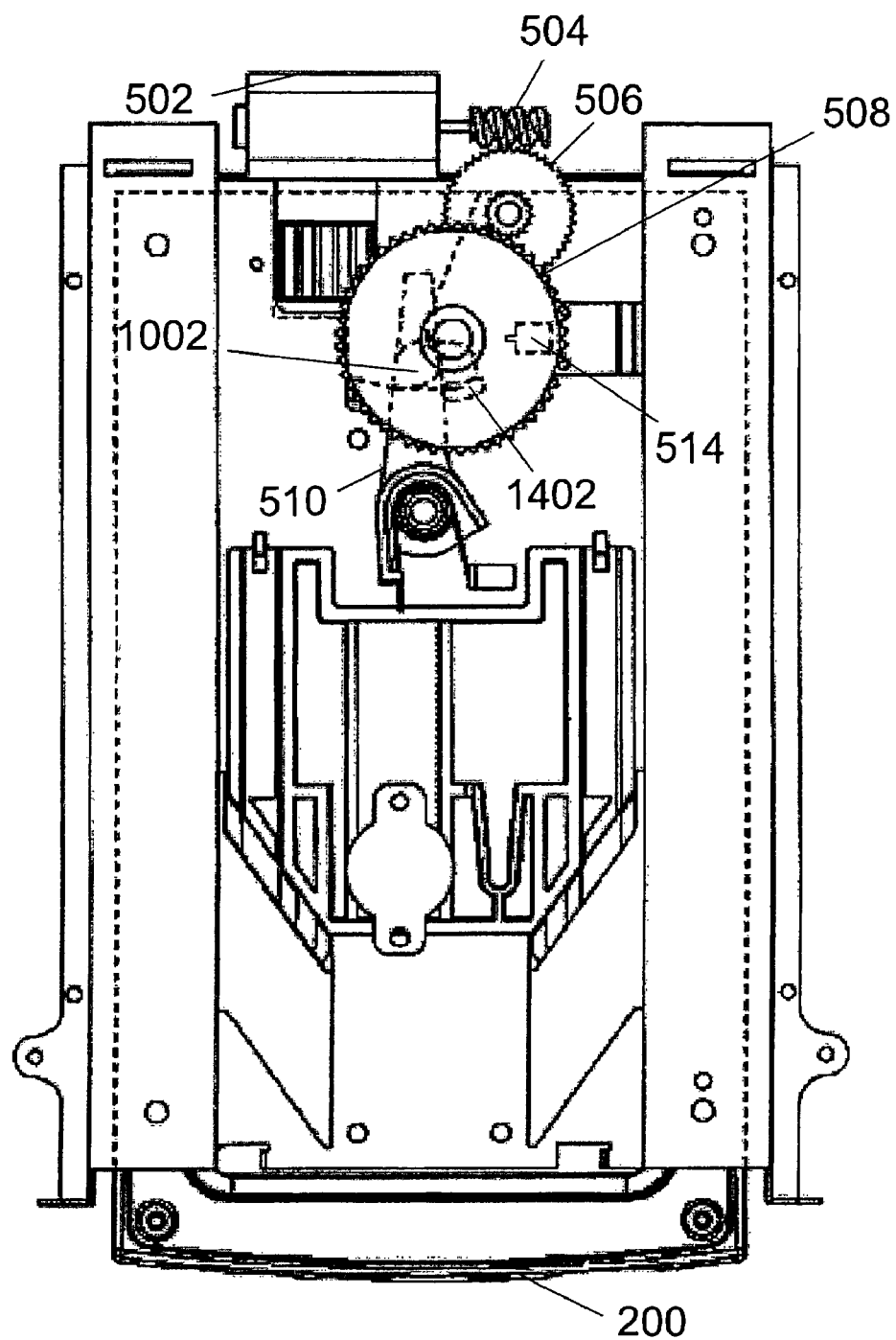
FIG. 24 illustrates an orthographic view of the lockdown/eject subsystem and HDD cartridge in a state during the process of ejection of the HDD cartridge.

Referring to step number 5 above and FIG. 24, the motor 502 is illustrated in an activated state. Upon activation of motor 502, the gear-train of worm 504 engages with step-down gear 506 which in turn engages with spur gear 508, causing spur gear 508 to rotate clockwise (with respect to the view shown in FIG. 24). Latch actuator 1402 rotates away from detector switch 514, thus detector switch 514 transitions from an activated state to a deactivated state. Latch actuator 1402 on spur gear 508 also comes into contact with the right edge of latch 510. As spur gear 508 continues to rotate during operation of motor 502, latch 510 is driven to rotate counter-clockwise with respect to the view shown in FIG. 24. As latch 510 rotates counter-clockwise, locking pin 1002 moves left in latch cavity 1502.

Figure 25:
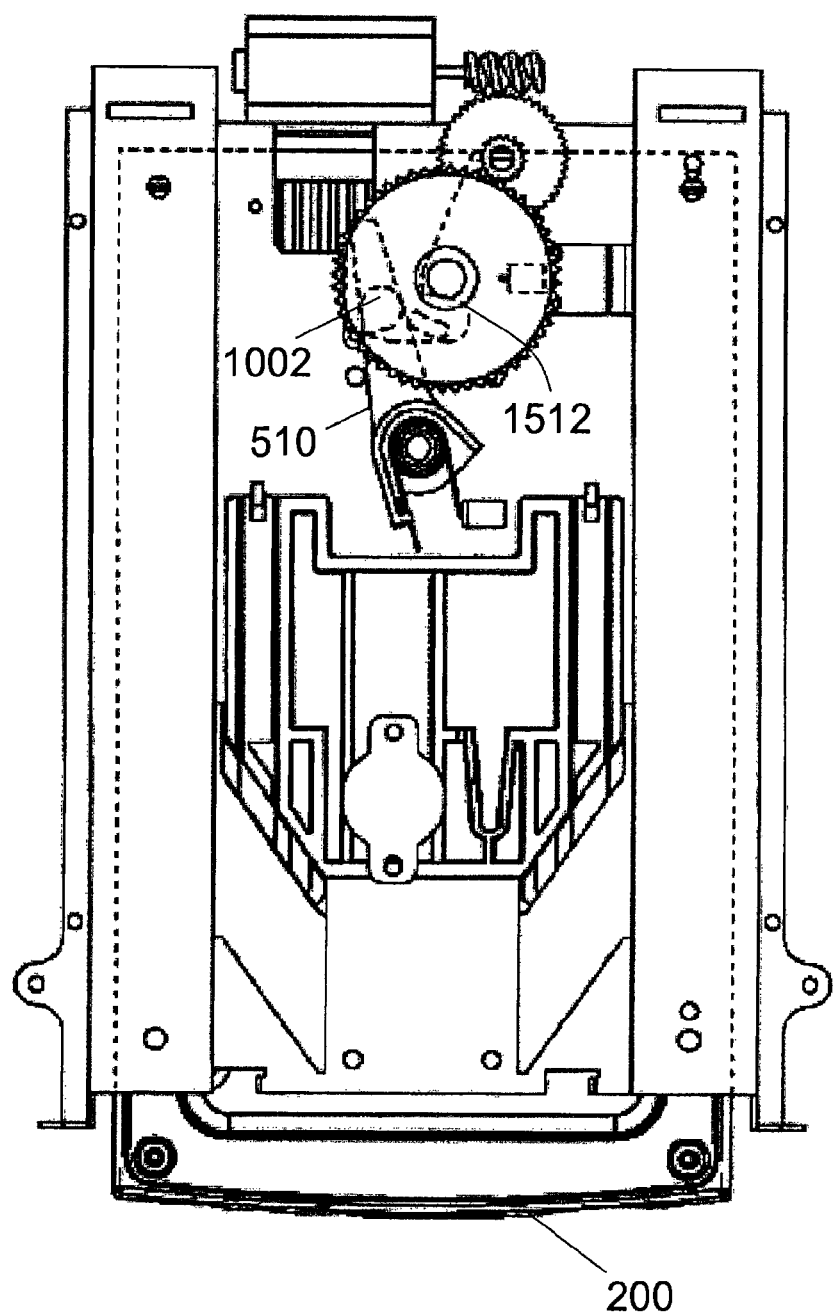
FIG. 25 illustrates an orthographic view of a lockdown/eject subsystem and HDD cartridge displaced.

In FIG. 24, locking pin 1002 on latch 510 has moved to the edge of the horizontal bottom surface of latch slot 1512. In FIG. 25, latch 510 has continued to rotate counter-clockwise and locking pin 1002 has moved further to the left. Locking pin 1002 engages with the angled surface on latch slot 1512 on cartridge bottom housing 706, forcing HDD cartridge 200 forward with respect to the processor module 100. This leveraged force overcomes any binding that may have occurred between HDD cartridge 200, pusher 1206, and lockdown chassis 302. Once any binding has been overcome, right and left pusher springs 806,804 force pusher 1206 and HDD cartridge 200 toward the front of processor module 100. FIG. 5 and FIG. 8 show dampener 522 that limits the ejection velocity of pusher 1206 during the ejection process.

The ejection process for mode 2 will now be described. The ejection mechanism state is the same as that which is described above for mode 1. The general sequence of events that occur when eject button 204 is activated by the user is as follows:

1. Microcontroller 306 signals to microprocessor 304 that ejection has been activated.
2. Microprocessor 304 signals to microcontroller 302 that HDD cartridge 200 is ready for ejection.
3. Microcontroller 306 activates power to motor 502 through one transition of the detector switch 514 from activated to deactivated.
4. Microcontroller 306 deactivates power to motor 502 upon transition of detector switch 514 from deactivated to activated.

Protection Against Drop

HDD 702 inside HDD cartridge 200, as shown in FIG. 6 in this disclosure, will experience reduced shock loads when dropped onto a firm surface because top cushion 712, bottom front cushion 714, right rear cushion 718, and left rear cushion 716 will absorb energy during impact. Because of the location of the elastomeric material, HDD 702 is protected when dropped on any of four corners or on any of six sides. To this end, front cushion 714, right rear cushion 718, and left rear cushion 716 are configured about cartridge bottom housing 706 such that portions of cartridge bottom housing 706 (i.e., latch slot 1512, right bevel cavity 1502, left bevel cavity 1504, right pusher track 1508, and left pusher track 1506) which are operative with corresponding components of processor module 100 for purposes of rigidly mounting HDD cartridge 200 to processor module 100 are exposed, while still providing a protective function with respect to the underside surface and corners of HDD cartridge 200. It will be understood and appreciated by those skilled in the art that different configurations of elastomeric materials about HDD cartridge 200 are possible, including substantially enclosing all of HDD cartridge 200 in an elastomeric or similar cushioning material, while still providing for the rigid mounting of HDD cartridge 200 with respect to processor module 100 in accordance with the teachings detailed herein.

Further Examples

Figure 26:
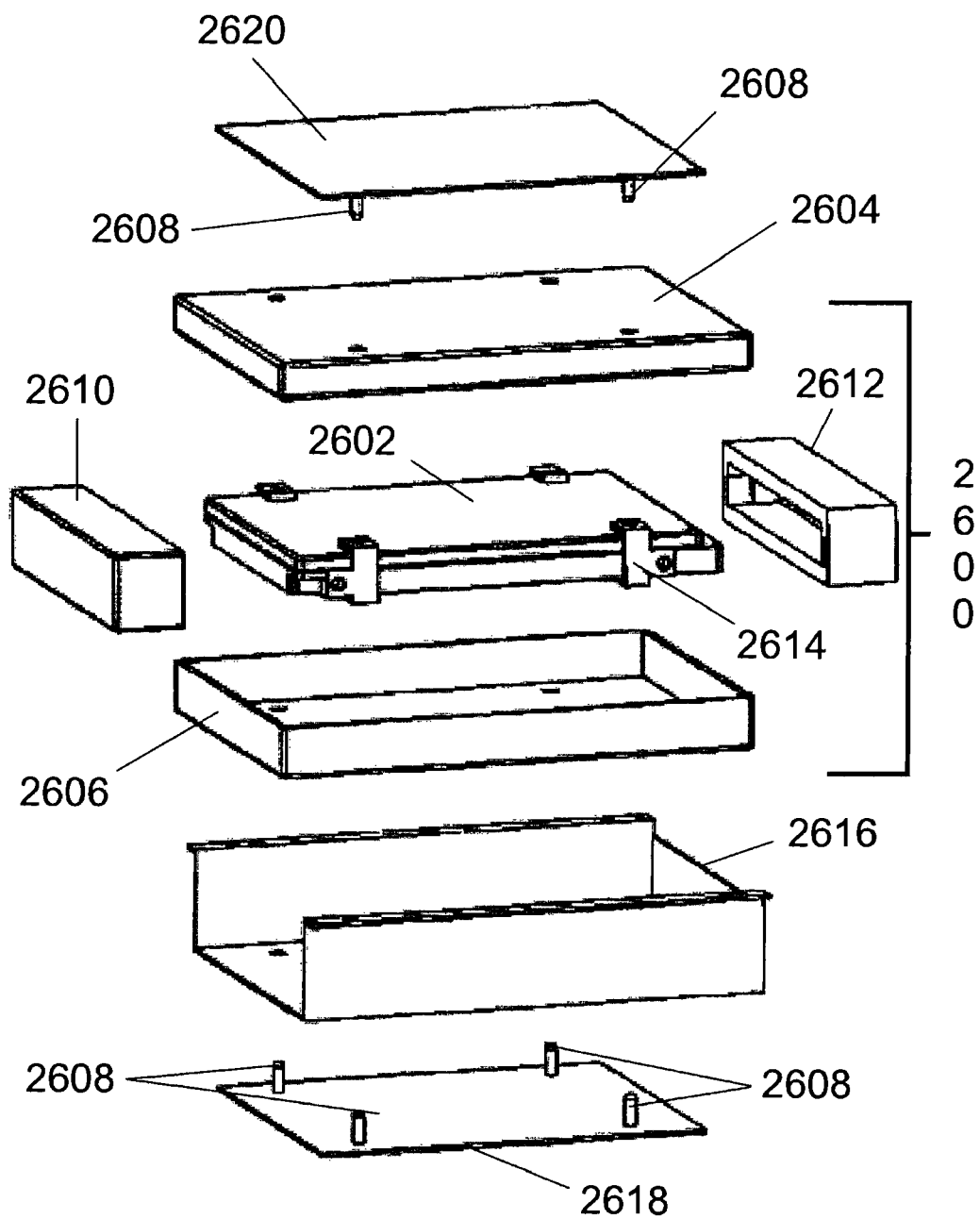
FIG. 26 illustrates an isometric exploded view of another exemplary system for locking down the HDD cartridge in a processor module.

FIG. 26 is an isometric exploded view of an exemplary system wherein the cushions 2610, 2612 that protect the hard disk drive 2602 from high shock loads are located inside of the plastic housing 2604, 2606 that surrounds the hard disk drive 2602. The HDD cartridge 2600 also includes four holes in the top housing 2604 and four holes in the bottom housing 2606 that receive metal pins 2608 when the HDD cartridge 2600 is in the lockdown position.

Figure 27:
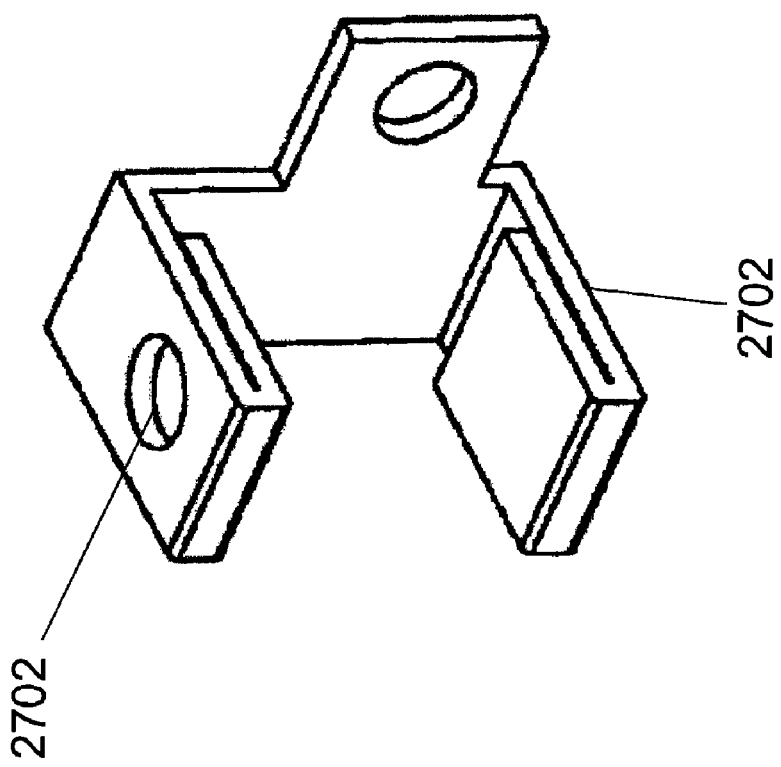
FIG. 27 illustrates an isometric view of an exemplary pin clip.
Figure 28:
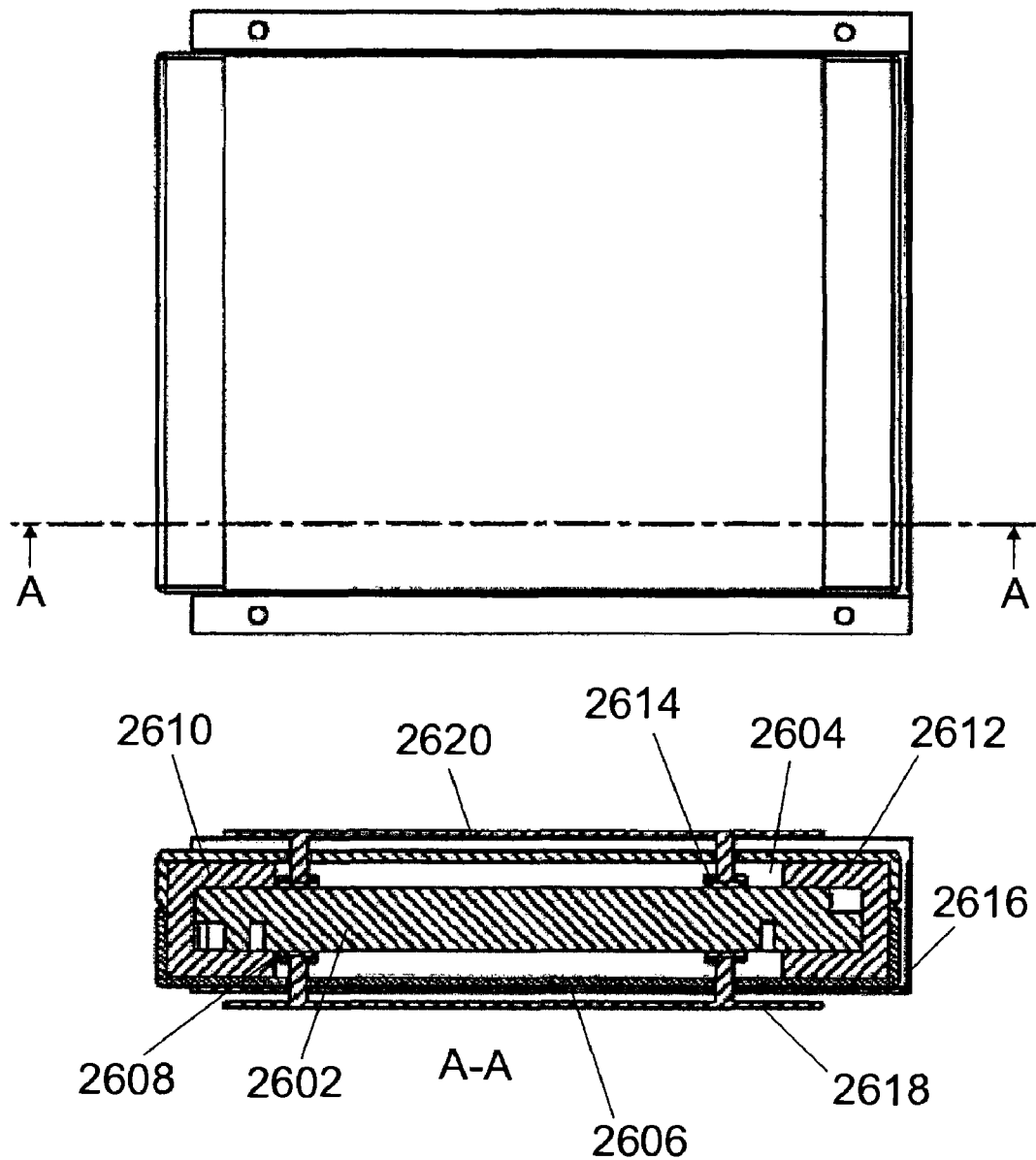
FIG. 28 illustrates an orthographic section view of yet another exemplary system for locking down the HDD cartridge.

FIG. 28 shows a sectional view along axis A through a HDD cartridge 2600 and a lockdown subsystem where the cushion is able to be located inside the HDD cartridge housing. When the HDD cartridge 2600 has been inserted fully into the processor module it is aligned by the chassis 2616. A top pin plate 2620 and bottom pin plate 2618 are displaced toward the HDD cartridge 2600. The top pin plate 2620 and the bottom pin plate 2618 each include four pins 2608 that align with the holes in the top housing 2604 and bottom housing 2606, respectively. The top pin plate 2620 and bottom pin plate 2618 are driven toward the HDD cartridge 2600 by a motorized mechanism (not shown) Four pin clips 2614 are attached to the HDD 2602 as shown in FIG. 26. A single pin clip 2614 is shown in FIG. 27, and is fabricated out of bent sheet metal. The pin clips both take the axial load of the pin 2608 against the HDD 2602, and also keep the HDD 2602 from moving laterally in any direction because each pin 2608 fits into a corresponding pin hole 2702 located on the top and bottom of each pin clip 2614. FIG. 28 shows four of the pins 2608 engaged in the top and bottom of two of the pin clips 2614.

HDD is generally protected from shock loads from dropping in this embodiment by the internal cushions 2610, 2612, which absorb the energy from the shock loads. It will be appreciated that it is well within the routine abilities of one skilled in the art to implement the various components and elements (including an appropriate motorized mechanism) given the inventive teachings described herein.

Figure 29:
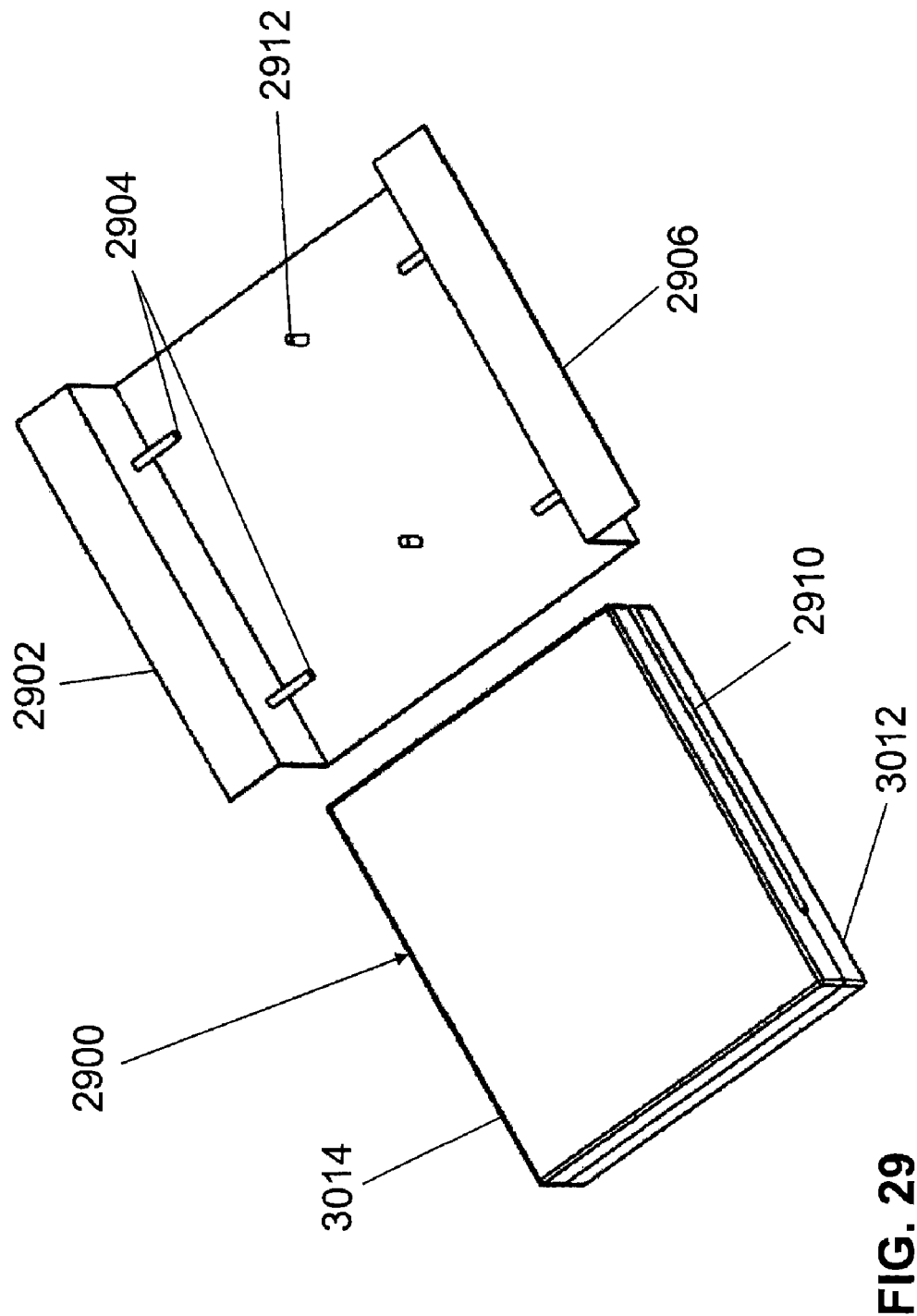
FIG. 29 illustrates an isometric view of exemplary fixed pins.
Figure 30:
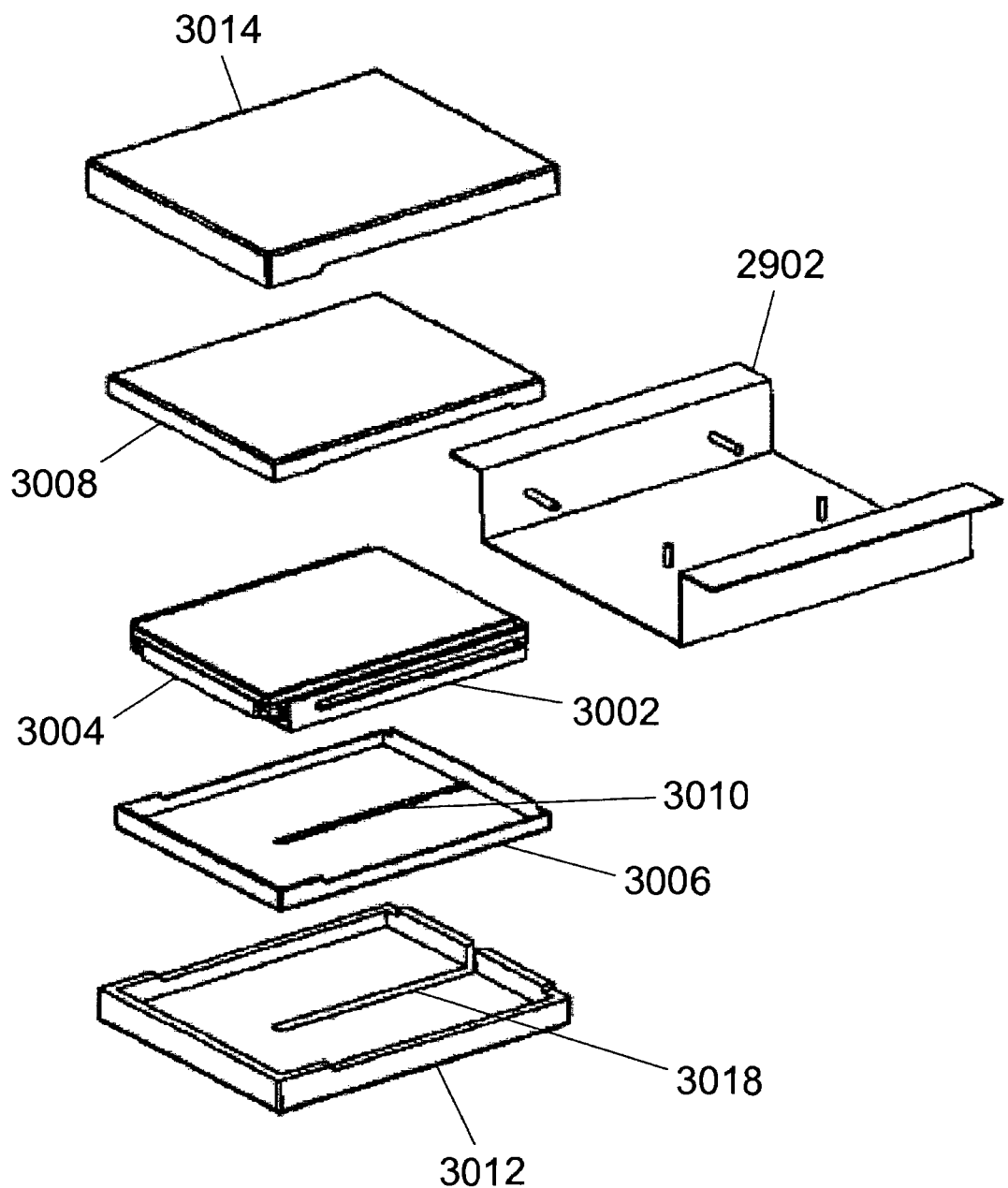
FIG. 30 illustrates an isometric exploded view of a lockdown subsystem using fixed pins.
Figure 31:
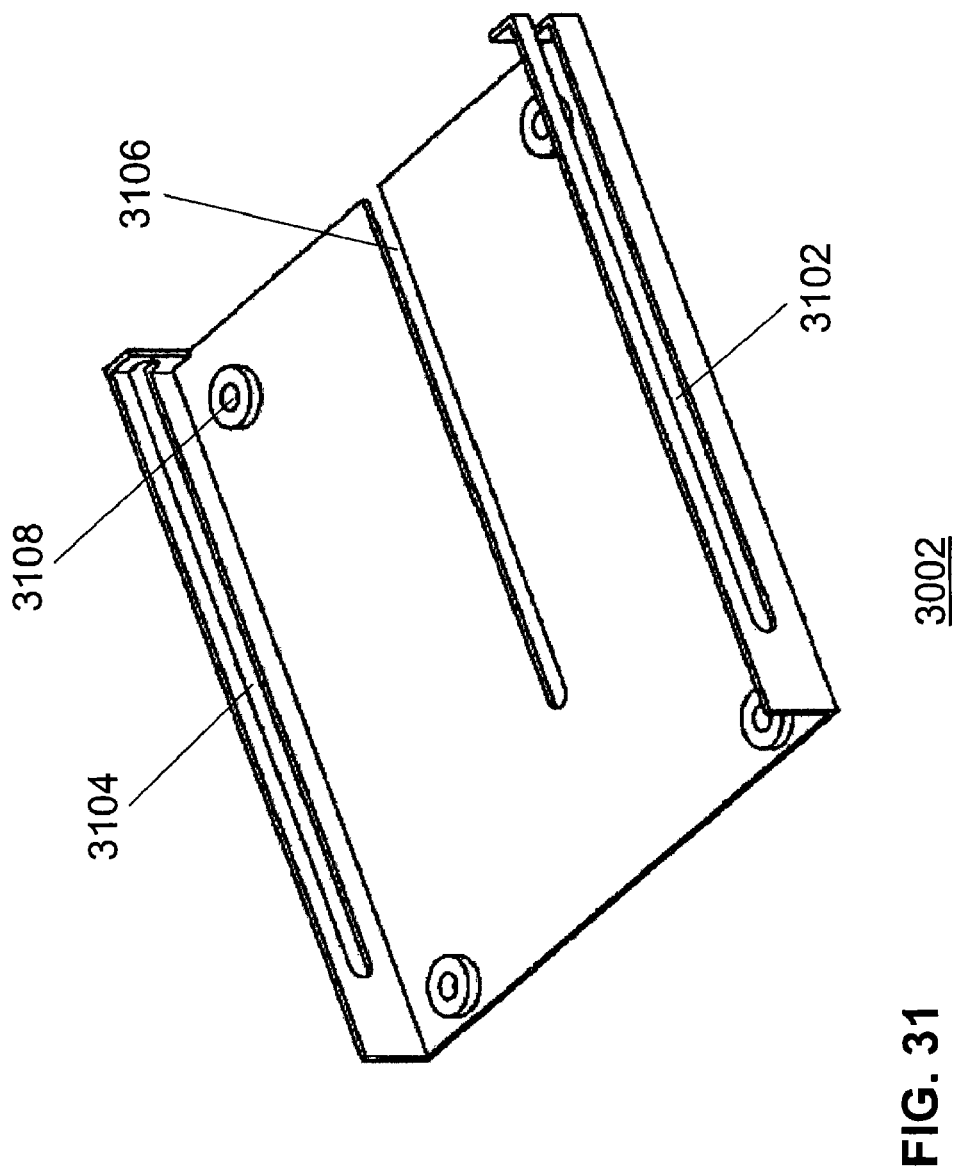
FIG. 31 illustrates an isometric view of the HDD slot plate.

FIG. 29 shows a fixed pin HDD cartridge 2900 and a fixed pin alignment chassis 2902 as a further exemplary system. This system uses a number of fixed metal pins 2904 protruding from the alignment chassis 2906 to constrain fixed pin HDD cartridge 2900 when inserted into the processor module. FIG. 30 shows an exploded view of the fixed pin HDD cartridge 2900 alongside the fixed pin alignment chassis 2902. A HDD slot plate 3002, fabricated out of sheet metal, is attached to HDD 3004. FIG. 31 shows that HDD slot plate 3002 includes two side slots 3102,3104 and a bottom slot 3106. Attachment holes 3108 in the bottom are used to screw the HDD slot plate 3002 to the HDD 3004.

Referring again to FIG. 30, a bottom housing 3006 and a top housing 3008 are attached to HDD 3004. Both bottom housing 3006 and top housing 3008 are made out of injection molded plastic, and include slots in the sides. The bottom housing includes a bottom slot 3010. The slots on bottom and top housings 3006, 3008 align with the slots on the HDD slot plate 3002. A bottom cushion 3012 and a top cushion 3014 are attached to bottom housing 3006 and top housing 3008 respectively, through the process of insert injection molding. Therefore, top and bottom cushions 3014, 3012 are securely attached to top and bottom housings 3008, 3006. Top cushion 3014 and bottom cushion 3012 also include slots 2910 in the side to provide clearance for pins. Bottom cushion 3012 also includes a bottom slot 3018 to provide clearance for bottom pins. The slots in the bottom and top cushions 3012, 3014 are aligned with the slots on HDD slot plate 3002.

When the user initially inserts fixed pin HDD cartridge 2900 into processor module, the side pins 2904 and bottom pins 2912 align with the slots 2910,3018,3010, 3102, 3104, 3106 present in the various components of the fixed pin HDD cartridge assembly 2900. The slots 3102 in HDD slot plate 3002 are slightly larger than the diameter of the pins 2904 in fixed pin alignment chassis 2902. The openings of the slots 3102, 3104, 3106 in HDD slot plate 3002 are slightly tapered, so initial engagement of the slots with the pins 2904,2912 is easily accomplished. The slots 2910,3010,3018 in the other components are clearance slots so their dimension is slightly larger than the slots 3102, 3104, 3106 in the HDD slot plate 3002. A motorized mechanism is used to lock the fixed pin HDD cartridge 2900 in the processor module once it is fully inserted.

When fixed pin HDD cartridge 2900 is fully inserted into processor module, fixed pin HDD cartridge 2900 is constrained and it cannot generally move with respect to processor module. Therefore, vibrations of the automobile's chassis are generally not amplified at the HDD 3004. It will also be appreciated that it is well within the routine abilities of one skilled in the art to implement the various components and elements (including an appropriate motorized mechanism) given the inventive teachings described herein.

While various concepts have been described in detail, it will be appreciated by those skilled in the art that various modifications and alternatives to those concepts could be developed in light of the overall teachings of the disclosure. For example, it should be appreciated that various configurations of removable media cartridges and processor modules or other similar housing elements may be implemented in a media playback system, and as such many combinations and variations of the above described housing, mounting, locking, and cushioning features and systems are possible without departing from the spirit and scope of the present invention. Further, while the embodiments presented above generally use cushioning materials and locking pins in various configurations, it will be appreciated that other methods for cushioning and locking a HDD or other media cartridge while inserted and removed from an outer housing (such as the processor module described herein) are also possible. Additionally, while the embodiments presented above are described in the context of vehicle based media playback devices having removable HDD elements as being most broadly representative of a device for which the mounting system of the present invention is most applicable, it will be appreciated that the teachings of this disclosure may be equally well applied to other devices wherein mounting and protective functions are required (i.e., data storage devices and other sensitive electronic devices susceptive to damage due to shock or vibration) without departing from the spirit and scope of the present invention. As such, the particular concepts disclosed are meant to be illustrative only and not limiting as to the scope of the invention which is to be given the full breadth of the appended claims and any equivalents thereof.

All documents cited within this application for patent are hereby incorporated by reference in their entirety.

What is claimed is:

1. A media cartridge comprising:
   a media storage device;
   a housing rigidly holding the media storage device, wherein the housing is configured to rigidly fix the media storage device inside an inner cavity of a media based deice during operation, wherein the housing comprises one or more track cavities configured to engage one or more bevels of the media based device for selective removal of the media cartridge from or insertion of the media cartridge into the media based device, and wherein the one or more track cavities extend along a longitudinal axis from a rear of the housing toward a front of the housing; and
   a cushion holding the housing, wherein the cushion comprises a resilient material disposed over corners of the housing such that the cushion does not interfere with the interaction of the one or more bevels and the one or more track cavities.

2. The media cartridge as recited in claim 1, wherein the housing further comprises a locking mechanism for providing insertion and ejection functions for the media cartridge with respect to the inner cavity.

3. The media cartridge as recited in claim 2, wherein a first portion of the locking mechanism is configured on an outer portion of the housing, and a second portion of the locking mechanism is configured in the media based device.

4. The media cartridge as recited in claim 3, wherein the first portion of the locking mechanism comprises a slot operatively couplable to a latch mechanism to provide automatic insertion and ejection of the media cartridge with respect to the media based device.

5. The media cartridge as recited in claim 4, wherein the resilient material is disposed about an outer portion of the media cartridge such that interaction between the first portion of the locking mechanism and the second portion of the locking mechanism is possible.

6. The media cartridge as recited in claim 1, wherein the resilient material is selected from the group consisting of rubber, polymer, and elastomer.

7. The media cartridge as recited in claim 1, wherein the resilient material disposed over the corners of the housing comprises a right rear cushion, a left rear cushion, and a bottom front cushion.

8. The media cartridge as recited in claim 7, wherein the resilient material disposed over the corners of the housing further comprises a top cushion.

9. The media cartridge as recited in claim 1, further comprising a connector operably coupled to the media storage device for connecting the media storage device to a computing device.

10. The media cartridge as recited in claim 1, further comprising an eject button included on a face of the cushion and capable of causing ejection of the media cartridge from the media based device.

11. The media cartridge as recited in claim 1, wherein the resilient material is disposed over all of the corners of the housing.

12. The media cartridge as recited in claim 1, wherein the cushion is not disposed over the one or more track cavities.

13. The media cartridge as recited in claim 1, wherein the one or more track cavities are disposed on a bottom of the housing.

14. The media cartridge as recited in claim 1, wherein the one or more track cavities each extend from an end surface at the rear of the housing toward the front of the housing such that the one or more track cavities extend beyond a point on the housing approximately half way between the end surface of the rear of the housing and an edge of the front of the housing.

15. The media cartridge recited in claim 1, further comprising a connector located within one of the one or more track cavities, wherein the one or more track cavities are formed in an end surface at the rear of the housing.

16. A system comprising:
    an outer module configured for rigidly mounting a media based device to a surface, the outer module having an inner cavity; and
    a media cartridge shaped and sized for insertion into the inner cavity of the outer module, the media cartridge including:
    a media storage device;
    a housing holding the media storage device, wherein the housing is configured to rigidly fix the media storage device inside an inner cavity of the media based device during operation, wherein the housing comprises one or more track cavities configured to engage one or more bevels of the media based device for selective removal of the media cartridge from or insertion of the media cartridge into the media based device, and wherein the one or more track cavities extend along a longitudinal axis from a rear of the housing toward a front of the housing; and
    a cushion holding the housing, wherein the cushion comprises a resilient material disposed over corners of the housing such that the cushion does not interfere with the interaction of the one or more bevels and the one or more track cavities.

17. The system as recited in claim 16, wherein the media cartridge further comprises a locking mechanism for providing insertion and ejection functions for the media cartridge with respect to the inner cavity of the outer module.

18. The system as recited in claim 17, wherein a first portion of the locking mechanism is configured on an outer portion of the media cartridge, and a second portion of the locking mechanism is configured in the outer module.

19. The system as recited in claim 18, wherein the first portion of the locking mechanism further comprises a slot, and the second portion of the locking mechanism further comprises a motor operatively connected to a latch mechanism, the motor and the latch mechanism operative with the slot for providing automatic insertion and ejection of the media cartridge with respect to the outer module.

20. The system as recited in claim 18, wherein the resilient material is disposed about an outer portion of the media cartridge such that interaction between the first portion of the locking mechanism and the second portion of the locking mechanism is possible.

21. The system as recited in claim 16, wherein the resilient material is selected from the group consisting of rubber, polymer, and elastomer.

22. The system as recited in claim 16, wherein the resilient material disposed over the corners of the housing comprises a right rear cushion, a left rear cushion, and a bottom front cushion.

23. The system as recited in claim 22, wherein the resilient material disposed over the corners of the housing further comprises a top cushion.

* * * * *

UNITED STATES PATENT AND TRADEMARK OFFICE
CERTIFICATE OF CORRECTION

| | | |
|---|---|---|
| PATENT NO. | : 8,184,400 B2 | |
| APPLICATION NO. | : 12/606386 | |
| DATED | : May 22, 2012 | |
| INVENTOR(S) | : Edwards et al. | |

It is certified that error appears in the above-identified patent and that said Letters Patent is hereby corrected as shown below:

In Column 6, Line 8, delete "into a" and insert -- into an --, therefor.

In Column 9, Line 46, delete "shown) Four" and insert -- shown). Four --, therefor.

In Column 11, Line 23, in Claim 1, delete "deice" and insert -- device --, therefor.

Signed and Sealed this
Ninth Day of October, 2012

David J. Kappos
*Director of the United States Patent and Trademark Office*